United States Patent Office 3,752,813
Patented Aug. 14, 1973

3,752,813
ORTHO-HYDROXY-DIHYDRO-PHENOZINE-CARBOXYLIC ACIDS AND DERIVATIVES
Tsung-Ying Shen, Westfield, Richard Greenwald, Fanwood, and Bruce E. Witzel and Gordon L. Walford, Westfield, N.J., assignors to Merck & Co., Inc., Rahway, N.J.
No Drawing. Original application June 25, 1969, Ser. No. 836,583, now Patent No. 3,642,997. Divided and this application Aug. 2, 1971, Ser. No. 168,424
Int. Cl. C07d 51/80
U.S. Cl. 260—267                           2 Claims

ABSTRACT OF THE DISCLOSURE

This invention relates to new tricyclic carboxylic acid and ester derivatives and processes for their preparation. These compounds have anti-inflammatory, anti-pyretic and analgesic activity. Also included are methods for preparing said carboxylic acid compounds.

---

This application is a division of application Ser. No. 836,583, filed June 25, 1969, now U.S. Pat. No. 3,642,997.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of non-steroid structure having less side effects.

SUMMARY OF THE INVENTION

Generally, this invention relates to new substituted tricyclic carboxylic acid compounds and processes for preparing the same. These compounds are useful in that they have anti-inflammatory activity and are effective in the prevention and inhibition of edema, and granuloma tissue formation. In addition, some of them have a useful degree of anti-pyretic and analgesic activity.

DESCRIPTION AND PREFERRED EMBODIMENTS

This invention relates to new substituted tricyclic carboxylic acid compounds and processes for preparing the same. More specifically, this invention relates to substituted tricyclic carboxylic acids, esters, amides, anhydrides and non-toxic pharmaceutically acceptable salts thereof. Still more specifically, this invention relates to compounds having the following general formula:

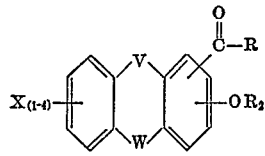

wherein:
R is selected from the group consisting of hydroxy, amino, loweralkoxy (such as methoxy, ethoxy, butoxy, pentoxy, and the like), loweralkylamino (methylamino, propylamino, pentylamino, and the like), diloweralkylamino (dimethylamino, dibutylamino, propylpentylamino, and the like), diloweralkylaminoloweralkylamino, diloweralkylaminoloweralkoxy, hydroxyloweralkoxy, (3-hydroxybutoxy and the like), polyhydroxyloweralkoxy (2,3 - dihydroxypropoxy, 2,3,4,5,6-pentahydroxyhexyloxy and the like), loweralkoxyloweralkoxy (ethoxyethoxy), arylloweralkoxy (benzyloxy, phenethoxy and the like), phenoxy, substituted phenoxy (such as loweralkoxyphenoxy, diloweralkylaminophenoxy, loweralkanoylaminophenoxy), carboxy and carboloweralkoxy, loweralkanoylaminoloweralkoxy, and hydroxyloweralkylamino;

$R_2$ may be hydrogen, acyl (preferably loweracyl such as formyl, acetyl, propionyl, butyryl, etc.), alkyl (preferably loweralkyl such as methyl, ethyl, propyl, isopropyl, butyl, pentyl, etc.), alkoxycarbonyl (preferably loweralkoxycarbonyl such as methoxycarbonyl, ethoxycarbonyl, etc.);

X may be hydrogen, alkyl (preferably loweralkyl, such as methyl, ethyl, propyl, isopropyl, butyl, pentyl, etc.), hydroxy, alkoxy (preferably loweralkoxy such as methoxy, ethoxy, isopropoxy or butoxy), acyloxy (such as acetoxy or propionoxy), halogen (such as chloro, bromo, fluoro or iodo, preferably fluoro or chloro), haloalkyl (preferably haloloweralkyl such as chloromethyl, trifluoromethyl, etc.), nitro, amino, alkylamino (preferably loweralkylamino such as methylamino, propylamino, pentylamino, etc.), diloweralkylamino (dimethylamino, dibutylamino, propylpentylamino, etc.), acylamino preferably (loweracylamino such as formylamino, acetylamino, propionylamino, butyrylamino, etc.), mercapto, alkylmercapto (preferably loweralkylmercapto such as methylmercapto, ethylmercapto, etc.), alkylsulfinyl (preferably loweralkylsulfinyl such as methylsulfinyl, ethylsulfinyl, butylsulfinyl, etc.), alkylsulfonyl (preferably loweralkylsulfonyl such as methylsulfonyl, ethylsulfonyl, butylsulfonyl, etc.), sulfonamide, sulfinylamido, aminoalkyl (preferably aminoloweralkyl such as aminomethyl, aminoethyl, etc.), alkylaminoalkyl (preferably loweralkylaminoloweralkyl such as methylaminomethyl, ethylaminomethyl, etc.), hydroxyalkyl (preferably hydroxyloweralkyl such as hydroxymethyl, hydroxyethyl, hydroxypropyl, etc.), alkoxyalkyl (preferably loweralkoxyloweralkyl such as methoxymethyl, methoxyethyl, ethoxyethyl, ethoxypropyl, etc.), mercaptoalkyl (preferably mercaptoloweralkyl such as mercaptomethyl, mercaptoethyl, etc.), alkylmercaptoalkyl (preferably loweralkylmercaptoloweralkyl such as methylmercaptomethyl, ethylmercaptoethyl, ethylmercaptopropyl, etc.), cyano, carboxy, carboalkoxy (carbomethoxy, carboethoxy, etc.), carbamyl, aryl (such as phenyl, tolyl, etc.), aralkyl (such as benzyl, phenethyl, etc.), aryloxy, aralkoxy, and acyl; and V and W may be carbyl, carbonyl, oxy, sulfo, sulfinyl, sulfonyl, amino or loweralkylamino;
provided that the $OR_2$ group is always ortho to the

group.

Representative compounds of this invention are:
5,10-dihydro-7-fluoro-2-hydroxyphenazine-3-carboxylic acid;
5,10-dihydro-8-fluoro-2-hydroxyphenazine-3-carboxylic acid;
5,10-dihydro-7-chloro-2-hydroxyphenazine-3-carboxylic acid;
5,10-dihydro-8-methoxy-2-hydroxyphenazine-3-carboxylic acid;
5,10-dihydro-7-dimethylamino-2-hydroxyphenazine-3-carboxylic acid;
5,10-dihydro-8-trifluoromethyl-2-hydroxyphenazine-3-carboxylic acid;
8-fluoro-2-hydroxyphenazine-1-carboxylic acid;
8-fluoro-2-hydroxyphenothiazine-3-carboxylic acid;
7-fluoro-3-hydroxyphenothiazine-2-carboxylic acid;
8-methoxy-2-hydroxyphenothiazine-3-carboxylic acid;
8-dimethylamino-2-hydroxyphenothiazine-3-carboxylic acid;
8-fluoro-2-hydroxyphenoxazine-3-carboxylic acid;

8-chloro-2-hydroxyphenoxazine-3-carboxylic acid;
8-trifluoromethyl-2-hydroxyphenoxazine-3-carboxylic acid;
8-methoxy-2-hydroxyphenoxazine-3-carboxylic acid;
8-dimethylamino-2-hydroxyphenoxazine-3-carboxylic acid;
6-fluoro-2-hydroxyacridine-1-carboxylic acid;
7-chloro-2-hydroxyacridine-1-carboxylic acid;
6-trifluoromethyl-2-hydroxyacridine-1-carboxylic acid;
6-methoxy-2-hydroxyacridine-1-carboxylic acid;
6-dimethylamino-2-hydroxyacridine-1-carboxylic acid;
6-fluoro-2-hydroxy-10-methylacridan-3-carboxylic acid;
7-chloro-2-hydroxy-10-n-propylacridan-3-carboxylic acid;
9,9-dimethyl-6-fluoro-3-hydroxyacridan-2-carboxylic acid;
7-chloro-9,9-diphenyl-3-hydroxyacridan-2-carboxylic acid;
8-fluoro-2-hydroxyphenoxathiin-3-carboxylic acid;
7-chloro-2-hydroxyphenoxathiin-3-carboxylic acid;
8-trifluoromethyl-2-hydroxyphenoxathiin-3-carboxylic acid;
7-fluoro-3-hydroxyphenoxathiin-2-carboxylic acid;
8-fluoro-2-hydroxyphenoxathiin-3-carboxylic acid 10,10-dioxide;
8-fluoro-2-hydroxythianthrene-3-carboxylic acid;
8-chloro-2-hydroxythianthrene-3-carboxylic acid;
7-trifluoromethyl-2-hydroxythianthrene-3-carboxylic acid;
7-methoxy-2-hydroxythianthrene-3-carboxylic acid;
8-dimethylamino-2-hydroxythianthrene-3-carboxylic acid;
8-fluoro-2-hydroxythianthrene-3-carboxylic acid 5,5,10,10-tetroxide;
8-fluoro-2-hydroxydibenzo-p-dioxin-3-carboxylic acid;
8-chloro-2-hydroxydibenzo-p-dioxin-3-carboxylic acid;
8-trifluoromethyl-2-hydroxydibenzo-p-dioxin-3-carboxylic acid;
8-methoxy-2-hydroxydibenzo-p-dioxin-3-carboxylic acid;
8-dimethylamino-2-hydroxydibenzo-p-dioxin-3-carboxylic acid;
7-fluoro-2-hydroxyanthracene-3-carboxylic acid;
6-chloro-2-hydroxyanthracene-3-carboxylic acid;
7-trifluoromethyl-2-hydroxyanthracene-3-carboxylic acid;
7-fluoro-2-hydroxyanthracene-1-carboxylic acid;
7-dimethylamino-2-hydroxyanthracene-3-carboxylic acid;
6-fluoro-2-hydroxyanthraquinone-3-carboxylic acid;
7-fluoro-2-hydroxyanthraquinone-3-carboxylic acid;
6-trifluoromethyl-2-hydroxyanthraquinone-3-carboxylic acid;
7-methoxy-2-hydroxyanthraquinone-3-carboxylic acid;
7-fluoro-2-hydroxy-9,19-dihydroanthracene-3-carboxylic acid;
6-fluoro-2-hydroxy-9-xanthenone-1-carboxylic acid;
6-chloro-2-hydroxy-9-xanthenone-1-carboxylic acid;
7-fluoro-2-hydroxy-9-xanthenone-1-carboxylic acid;
6-fluoro-2-hydroxyxanthene-3-carboxylic acid;
7-fluoro-2-hydroxyxanthene-3-carboxylic acid;
7-chloro-2-hydroxyxanthene-3-carboxylic acid;
7-trifluoromethyl-2-hydroxyxanthene-3-carboxylic acid;
7-fluoro-2-hydroxythioxanthene-3-carboxylic acid; and
7-fluoro-2-hydroxythioxanthene-3-carboxylic acid 10,10-dioxide.

This invention also relates to a method of treating inflammation in patients (animal or human) using a compound of Formula I, particularly an especially preferred compound as the active constituent.

The compounds of the instant invention can be used to treat inflammation by reducing inflammation and relieving pain in such diseases as rhenumatoid arthritis, osteoarthritis, gout, infectious arthritis and rhenumatic fever.

The compounds of Formula I also have antipyretic and analgestic activity and would be administered and used in the same mannner and in the same dosage ranges as if they were being used to treat inflammation as discussed further on.

The treatment of inflammation in accordance with the method of the present invention is accomplished by orally, rectally, parenterally, or topically administering to patients a composition of a compound of Formula I, particularly the especially preferred compounds in a non-toxic pharmaceutically acceptable carrier, preferably in tablet or capsule form.

The non-toxic pharmaceutical carrier may be, for example, either a solid or a liquid. Exemplary of solid carriers are lactose, corn starch, gelatin, talc, sterotix, stearic acid, nagnesium stearate, terra alba, sucrose, agar, pectin, Cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid suspension. Suppositories for rectal administration and gels for topical administration may be prepared in conventional manners.

The active compounds of Formula I and of the compositions of this invention are present in an amount sufficient to treat inflammation, that is to reduce inflammation Advantageously, the composition will contain the active ingredient, namely, the compounds of Formula I, in an amount of from about 1 mg. to 100 mg. per kg. body weight per day (50 mg. to 7 g. per patient per day), preferably from about 2 mg. to 50 mg./kg. body weight per day (100 mg. to 3 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 1 mg to 100 mg./kg. body weight per day, preferably from about 2 mg. to about 50 mg. per kilogram body weight per day and especially from 4 mg. to 20 mg./kg. body weight per day. The most rapid and effective anti-inflammatory effect is obtained from oral administration of a daily dosage of from about 4 to 20 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The acid compounds of this invention may be prepared by carboxylating the appropriately substituted phenazinol, hydroxy - 5,10 - dihydrophenazine, phenothiazinol, phenoxazinol, acridinol, acridanol, thianthrenol, phenoxathiinol, hydroxydibenzo-p-dioxin, hydroxyanthraquinone, anthrol, hydroxy - 9,10 - dihydroanthracene, hydroxyanthene, hydroxyxanthenone, or hydroxythioxanthene. This can be accomplished by heating the appropriate above-mentioned compound under pressure with carbon dioxide gas in the presence of an alkali metal carbonate. The product can then be isolated from the reaction mixture by methods known in the art. The temperature at which the carboxylation reaction can take place is from 50 to 300° C. The reaction can also take place at from atmospheric pressure to high pressure, preferably however at 200° C., and at about 1000 p.s.i. pressure.

The substituted phenazinols and hydroxy-5,10-dihydrophenazines may be prepared by reacting a substituted aniline with a methoxy-substituted o-halonitrobenzene to form a substituted methoxy-2-nitrodiphenylamine which is then ring-closed in a conventional manner to form a methoxyphenazine. The methoxyphenazine is then demethylated to form a phenazinol which may be carboxylated to form the corresponding substituted hydroxyphenazine carboxylic acid. The phenazinol may also be reduced to form the corresponding hydroxy-5,10-dihydrophenazine which is then carboxylated to form the corresponding substituted hydroxy - 5,10-dihydrophenazine carboxylic acid.

The phenothiazinols may be produced by reacting a substituted benzenethiol with a methoxy-substituted o-halonitrobenzene to produce a substituted methoxy-2-nitrodiphenyl sulfide which is reduced to the corresponding methoxy-2-aminodiphenyl sulfide and ring-closed to form a methoxyphenothiazine. The methoxyphenothiazine is then demethylated to form the corresponding phenothiazinol. The phenothiazinols may also be produced by condensing a substituted 2-aminobenzenethiol zinc salt with a 2,5-dihydroxyhalobenzene. The phenothiazinols may then be carboxylated to form the substituted hydroxyphenothiazine carboxylic acids of this invention.

The phenoxazinols may be prepared by reacting a substituted phenol with a methoxy-substituted o-halonitrobenzene to form a substituted methoxy-2-nitrodiphenyl ether which is reduced to the corresponding methoxy-2-aminodiphenyl ether, ring-closed, and demethylated to form a substituted phenoxazinol. The phenoxazinols are then carboxylated to form the corresponding substituted hydroxyphenoxazine carboxylic acids of this invention.

The substituted acridinols and acridanols may be produced by demethylating the corresponding substituted methoxyacridines and methoxyacridans which are then carboxylated to form the appropriately substituted hydroxyacridine or hydraxyacridan carboxylic acids of this invention.

The phenoxanthiinols and thianthrenols may be prepared by reacting a substituted phenol or thiophenol with a nitro-substituted o-halobenzenesulfinic acid to produce a substituted nitro-2-sulfinodiphenyl ether or nitro-2-sulfinodiphenyl sulfide which is then ring-closed to form a substituted nitrophenoxathiin or nitrothianthrene. The latter compounds are reduced to the corresponding amino compounds, diazotized to form the phenoxathiinols and thianthrenols, and then carboxylated to form the acid compounds of this invention. The nitrophenoxathiin and nitrothianthrene compounds may be oxidized to the corresponding nitrophenoxathiin 10,10 - dioxide or nitrothianthrene 5,5,10,10-tetroxide compounds which are then treated further as described above to form the carboxylic acid compounds.

Hydroxydibenzo-p-dioxins may be produced by reacting a substituted guaiacol with a nitro-substituted o-haloanisole to form a substituted nitro-2,2'-dimethoxydiphenyl ether which is demethylated and cyclized to form a substituted nitrodibenzo-p-dioxin. The latter is then reduced to the corresponding amino compound, diazotized to form the hydroxydibenzo-p-dioxin which is then carboxylated to form the carboxylic acid compound of this invention.

Substituted anthrols and hydroxy-9,10-dihydroanthracenes may be produced by reacting a substituted benzoyl halide with m- or p-xylene to produce a substituted 2,4- or 2,5-dimethylbenzophenone which in turn is oxidized to the corresponding benzophenone dicarboxylic acid; the latter is then cyclized to form a substituted anthraquinone-2-carboxylic acid. This compound is amidated to form the corresponding anthraquinone-2-carboxamide which undergoes a Hofmann rearrangement to form a substituted aminoanthraquinone. This compound is diazotized to form a substituted hydroxyanthraquinone which is reduced to form the corresponding substituted anthrol. The anthrols may be carboxylated to form the substituted hydroxyanthracene carboxylic acids of this invention, or may first be further reduced and then carboxylated to form the substituted hydroxy-9,10-dihydroanthracene carboxylic acids of this invention.

In order to form the hydroxyanthraquinone carboxylic acids of this invention, the substituted 2,4- or 2,5-dimethylbenzophenones are nitrated and oxidized to form the nitrobenzophenone dicarboxylic acids which are then reduced to the corresponding amino compounds. The substituted aminobenzophenone dicarboxylic acids are diazotized to form the corresponding hydroxy compounds which are cyclized to form the substituted hydroxyanthraquinone carboxylic acids of this invention.

The substituted hydroxyxanthenes and hydroxyxanthenones may be produced by reacting a substituted o-halobenzoic acid with a methoxyphenol to produce a substituted methoxy-2-carboxydiphenyl ether which is ring-closed to form a substituted methoxyxanthenone. This compound may be demethylated to form the corresponding hydroxyxanthenone or reduced to the corresponding methoxyxanthene which is demethylated to form the corresponding hydroxyxanthene. The hydroxyxanthenes are then carboxylated to form the hydroxyxanthene carboxylic acids of this invention. The hydroxyxanthenone compounds may be converted to hydroxyxanthenone carboxaldehydes and then to the hydroxyxanthenone carboxylic acids of this invention.

In order to form the substituted hydroxythioxanthenes, a nitro-substituted o-halobenzaldehyde is reacted with a substituted thiophenol to produce a substituted nitro-2-formyldiphenyl sulfide which is ring-closed to form a mixture containing a substituted nitrothioxanthenone and the corresponding nitrothioxanthene. The latter may be reduced to the corresponding substituted aminothioxanthene, and the amino compound in turn diazotized to form the hydroxy compound which is carboxylated to form an acid compound of this invention.

The nitrothioxanthenone-nitrothioxanthene mixture, or either component thereof, may be oxidized to the corresponding substituted nitrothioxanthenone 10,10-dioxide, which after reduction, diazotization, and carboxylation, provides an acid compound of this invention.

The compounds of this invention wherein R is a group such that an ester is the final compound (i.e. R is alkoxy) are prepared by any esterification procedure using an esterifying agent containing the appropriate R group. For example, the carboxylic acid compounds of this invention may be reacted with the appropriate lower alkanol, (preferably methanol) at elevated temperatures in the presence of a strong acid such as hydrochloric acid, sulfuric acid, p-toluenesulfonic acid and the like to form the desired ester.

The compounds of this invention wherein R is a group such than an amide is the final compound (i.e. R is amino) or substituted amino may be prepared by any suitable amidation reaction. For example, the carboxylic acid compound (preferably the methyl or ethyl ester) may be reacted with ammonia, ammonium hydroxide, or an amine, at any suitable temperature (room temperature to reflux). When the amino group is desired, it is preferred to carry out the reaction with ammonia in a bomb at temperatures above 100° C. to form the desired R (amino) compound. Preferably, when an amide is desired which is derived from an amino acid, the following reaction sequence is followed: The carboxylic acid final compound is reacted with isobutyl chlorocarbonate to form the mixed anhydride. This compound is in turn reacted with the desired amino acid ester and subsequently hydrolyzed to form the desired amide.

The salts of the final acid compounds of this invention may be prepared by any of the well-known metathesis procedures. For example, the carboxylic acid compound may be reacted with an inorganic base such as sodium hydroxide, potassium hydroxide, ammonium hydroxide and barium hydroxide and the like. The anhyride of this invention may be prepared by any of the well-known procedures in the art.

The following examples are presented to further illustrate the invention:

EXAMPLE 1

2′,4-dimethoxy-5′-fluoro-2-nitrodiphenylamine

A mixture of 5-fluoro-o-anisidine (28.2 g., 0.20 mole), 4-bromo-3-nitroanisole (46.4 g., 0.20 mole), and anhydrous sodium acetate (32.8 g., 0.40 mole) is heated in an oil-bath at 210–220° for 40 hours.

The mixture is then steam-distilled until all volatile material is removed. The residue is allowed to cool, and the crude 2′,4-dimethoxy-5′-fluoro-2-nitrodiphenylamine is collected and washed thoroughly with cold water. It is purified by recrystallization (charcoal) from alcohol.

By replacing one or both of the aromatic components in the above example with other suitably substituted benzene derivatives, other substituted 2-nitrodiphenylamines may be obtained. For example, when 5-fluoro-o-anisidine is replaced by p-fluoroaniline or by 4-fluoro-o-anisidine, 4′-fluoro-4-methoxy-2-nitrodiphenylamine or 2′,4-dimethoxy-4′-fluoro-2-nitridiphenylamine, respectively, is obtained.

Similarly, 5-fluoro-o-anisidiine may be replaced by p-aminobenzotrifluoride, ethyl p-aminobenzoate, or α-phenyl-p-toluidine; 4 - methoxy - 2 - nitro-4′-trifluoro-methyldiphenylamine, 4′-carboethoxy-4-methoxy-2-nitrodiphenylamine, or 4′-benzyl-4-methoxy-2-nitrodiphenylamine respectively, is obtained.

When 5-fluoro-o-anisidine is replaced by 2,5-dihydroxyaniline and 4-bromo-3-nitroanisole is replaced by 3-chloro-4-nitroanisole or 4-chloro-3-nitrophenyl methyl sulfide, there is obtained 2′,5′-dihydroxy-5-methoxy-2-nitrodiphenylamine or 2′,5′-dihydroxy-4-methylthio-2-nitrodiphenylamine, respectively.

EXAMPLE 2

7-fluoro-2-methoxyphenazine

A mixture of 2′,4-dimethoxy-5′-fluoro-2-nitrodiphenylamine (5.0 g., 0.017 mole), ferrous oxalate (6.1 g., 0.034 mole), and granulated lead (50 g.) is heated in an oil-bath at 250–260° for 20 minutes. The mixture is then withdrawn from the bath, allowed to cool, and transferred to a sublimation apparatus. Sublimation in vacuo gives crude 7-fluoro-2-methoxyphenazine, which is purified by crystallization from ethanol.

When the substituted 2-nitrodiphenylamines of Example 1 are used in place of 2′,4-dimethoxy-5′-fluoro-2-nitrodiphenylamine in the above example, substituted phenazines are obtained as follows: 8-fluoro-2-methoxyphenazine is obtained from either 4′-fluoro-4-methoxy-2-nitrodiphenylamine or 2′,4-dimethoxy-4′-fluoro-2-nitrodiphenylamine; 8 - trifluoromethyl - 2 - methoxyphenazine, 8 - carboethoxy - 2 - methoxyphenazine, and 8-benzyl-2-methoxyphenazine are obtained from 4-methoxy-2-nitro-4′ - trifluoromethyldiphenylamine, 4′ - carboethoxy-4-methoxy - 2-nitrodiphenylamine, and 4′-benzyl-4-methoxy-2 - nitrodiphenylamine, respectively; 8-methoxy-2-phenazinol and 7-methylthio - 2 - phenazinol are obtained from 2′,5′-dihydroxy-5-methoxy-2-nitrodiphenylamine and 2′,5′-dihydroxy - 4 - methylthio - 2 - nitrodiphenylamine, respectively.

EXAMPLE 3

7-fluoro-2-phenazinol

A solution of 7-fluoro-2-methoxyphenazine (4.6 g., 0.02 mole) in 48% hydrobromic acid (125 ml.) is heated in an oil-bath at 110–120° for 5 hours.

The reaction mixture is allowed to cool, diluted with water (125 ml.), rendered nearly neutral with aqueous sodium hydroxide, and extracted repeatedly with ether. The combined ether extracts in turn are extracted repeatedly with aqueous 10% sodium hydroxide. The combined aqueous extracts are made acid to litmus with dilute acetic acid, and re-extracted with four 50 ml. portions of ether. The combined ether extracts are dried over anhydrous sodium sulfate, filtered, and evaporated in vacuo to give 7-fluoro-2-phenazinol. The product is purified by recrystallization from aqueous alcohol.

When 6 - bromo - 2 - methoxyphenazine, 6-iodo-2-methoxyphenazine, 6 - methyl - 2 - methoxyphenazine, 6-nitro - 2 - methoxyphenazine, 7 - phenyl-2-methoxyphenazine, 8 - methyl - 2 - methoxyphenazine, 8 - phenyl-2-methoxyphenazine, 9 - chloro - 2 - methoxyphenazine, 9-methyl - 2 - methoxyphenazine, 9 - phenyl - 2 - methoxyphenazine or any of the substituted 2-methoxyphenazines (except 8 - methoxy - 2 - phenazinol) of Example 2, is used in place of 7-fluoro-2-methoxyphenazine in the above example, the corresponding substituted 2-phenazinol is obtained.

EXAMPLE 4

5,10-dihydro-7-fluoro-2-hydroxyphenazine

A solution of 7 - fluoro - 2-phenazinol (4.3 g., 0.02 mole) in ethanol (50 ml.) is shaken with hydrogen gas at 40 p.s.i. and room temperature in the presence of Raney-nickel catalyst until the calculated quantity of hydrogen is taken up.

The reaction mixture is filtered from the catalyst, and the filtrate is evaporated in vacuo. Crystallization of the residue from aqueous alcohol gives 5,10-dihydro-7-fluoro-2-hydroxyphenazine. The product is stored and handled in an inert atmosphere because of its extreme sensitivity to air oxidation.

When 6-amino-2-phenazinol, 6-phenyl-2-phenazinol, 7-bromo - 2 - phenazinol, 7-chloro-2-phenazinol, 7-methoxy-2 - phenazinol, 7 - methyl - 2 - phenazinol, 8 - amino-2-phenazinol, 8 - bromo - 2 - phenazinol, 8 - chloro-2-phenazinol, or any of the substituted 2-phenazinols of Examples 2 and 3 is used in place of 7-fluoro-2-phenazinol in the above example, the corresponding substituted 5,10-dihydro - 2 - hydroxyphenazine is obtained.

EXAMPLE 5

5,10-dihydro-7-fluoro-2-hydroxyphenazine-3-carboxylic acid

An intimate mixture of 5,10-dihydro-7-fluoro-2-hydroxyphenazine (3.0 g., 0.014 mole) and anhydrous potassium carbonate (10.7 g., 0.078 mole) is heated at 200–220° for 24 hours with dry carbon dioxide at a pressure of 50 atmospheres.

The reaction mixture is extracted with hot water (250 ml.); the extract is treated with carbon, filtered, the filtrate acidified with hydrochloric acid, and chilled thoroughly. 5,10 - dihydro - 7-fluoro-2-hydroxyphenazine-3-carboxylic acid is collected by filtration and washed thoroughly with cold water.

When the substituted 5,10 - dihydro - 2 - hydroxyphenazines of Example 4 are used in place of 5,10-dihydro-7-fluoro - 2 - hydroxyphenazine in the above example, the corresponding substituted 5,10 - dihydro - 2-hydroxyphenazine-1-carboxylic acids are obtained.

When the substituted 2-phenazinols of Examples 2 and 3 or those cited in Example 4 are used in place of 5,10-dihydro - 7 - fluoro - 2 - hydroxyphenazine in the above example, the corresponding substituted 2-hydroxyphenazien-1-carboxylic acids are obtained.

EXAMPLE 6

2′-bromo-4′-fluoro-4-methoxy-2-nitrodiphenylsulfide

A solution of sodium ethoxide, prepared by adding sodium metal (1.92 g., 0.084 g.-atom) to absolute ethanol (62 ml.), is cooled to 10°, and treated dropwise with 2-bromo-4-fluorobenzenethiol (17.0 g., 0.082 mole). The resulting solution is added dropwise with stirring to a solution of 4 - chloro - 3 - nitroanisole (15.5 g., 0.075 mole) in absolute ethanol (62 ml.). The reaction mixture is then heated under reflux with continued stirring for 3 hours.

The mixture is chilled thoroughly, and 2' - bromo-4'-fluoro - 4 - methoxy - 2 - nitrodiphenylsulfide is collected by filtration and washed with water.

When 3 - chloro - 4 - nitroanisole is used in place of 4-chloro-3-nitroanisole in the above example, 2'-bromo-4'-fluoro - 5 - methoxy - 2 - nitrodiphenylsulfide is obtained.

EXAMPLE 7

2-amino-2'-bromo-4'-fluoro-4-methoxydiphenylsulfide

A mixture of 2'-bromo-4'-fluoro-4-methoxy-2-nitrodiphenylsulfide (17.9 g., 0.050 mole), stannous chloride dihydrate (90 g., 0.40 mole), and concentrated hydrochloric acid (75 ml.) is heated under reflux for 2 hours.

The mixture is then cooled in an ice-bath and rendered alkaline with aqueous 10% sodium hydroxide. The basic mixture is extracted repeatedly with ether, the combined extracts washed with water, dried over anhydrous magnesium sulfate, filtered, and evaporated in vacuo to give 2-amino-2'-bromo-4'-fluoro-4-methoxydiphenylsulfide.

When 2' - bromo-4'-fluoro-5-methoxy-2-nitrodiphenylsulfide is used in place of 2'-bromo-4'-fluoro-4-methoxy-2-nitrodiphenylsulfide, 2-amino-2'-bromo-4'-fluoro-5-methoxydiphenylsulfide is obtained.

EXAMPLE 8

2'-bromo-4'-fluoro-2-formamido-4-methoxydiphenylsulfide

A mixture of 2-amino-2'-bromo-4'-fluoro-4-methoxydiphenylsulfide (8.2 g., 0.025 mole) and 90% formic acid (82 g.) is heated under reflux for 10 hours.

The mixture is diluted with an equal volume of water, and chilled thoroughly. 2'-bromo-4'-fluoro-2-formamido-4-methoxydiphenylsulfide is collected by filtration and washed with cold water.

When 2-amino-2'-bromo-4'-fluoro-5-methoxydiphenylsulfide is used in the above example in place of 2-amnio-2'-bromo-4'-fluoro-4-methoxydiphenylsulfide, 2'-bromo-4'-fluoro-2-formamido-5-methoxydiphenylsulfide is obtained.

EXAMPLE 9

8-fluoro-2-methoxyphenothiazine

A mixture of 2-amino-2'-bromo-4'-fluoro-4-methoxydiphenylsulfide (16.4 g., 0.050 mole), anhydrous potassium carbonate (8.3 g., 0.060 mole), copper-bronze powder (1.0 g.), and dimethylformamide (150 ml.) is stirred under reflux for 30 hours.

The reaction mixture is filtered, the collected solid washed with DMF (25 ml.), and the combined filtrate and washings diluted with ice-water (2 l.). 8-fluoro-2-methoxyphenothiazine is collected by filtration, dried, and purified by recrystallization from benzene.

When 2-amino-2'-bromo-4'-fluoro-5-methoxydiphenylsulfide is used in place of 2-amino-2'-bromo-4'-fluoro-4-methoxydiphenylsulfide in the above example, 8-fluoro-3-methoxyphenothiazine ( 2- fluoro - 7 - methoxyphenothiazine) is obtained.

When 2'-bromo-4'-fluoro-2-formamido-4- and 5-methoxydiphenylsulfides are used in the above example, the reflux period may be shortened (3–8 hours is sufficient); 7-fluoro-2-methoxyphenothiazine and 7-fluoro-3-methoxyphenothiazine, respectively, are obtained.

EXAMPLE 10

7-fluoro-3-phenothiazinol

A mixture of 7-fluoro-3-methoxyphenothiazine (4.9 g., 0.020 mole) and pyridine hydrochloride (11.6 g., 0.10 mole) is heated in an oil-bath at 200° for 5 hours.

The melt is cooled, poured into an excess of cold water, and extracted repeatedly with ether. The combined extracts are treated briefly with charcoal, dried over anhydrous magnesium sulfate, filtered, and evaporated in vacuo. The residue is crystallized from benzene to give 7-fluoro-3-phenothiazinol.

When 7-chloro-2-methoxyphenothiazine, 8-trifluoromethyl-2-methoxyphenothiazine, 9-methyl - 2 - methoxyphenothiazine, 6-chloro - 3 - methoxyphenothiazine, 7-bromo-3-methoxyphenothiazine, 7-ethyl-3-methoxyphenothiazine, 7-nitro-3-methoxyphenothiazine, 9-fluoro-3-methoxyphenothiazine, 9-methyl-3-methoxyphenothiazine or any of the substituted 2- or 3-methoxyphenothiazines of Example 9 is used in place of 7-fluoro-3-methoxyphenothiazine in the above example, the corresponding substituted 2- or 3-phenothiazinol is obtained.

EXAMPLE 11

8-fluoro-3-phenothiazinol (2-fluoro-7-hydroxyphenothiazine)

A mixture of 2-amino-4-fluorobenzenethiol zinc salt (35.0 g., 0.10 mole), 2-chlorohydroquinone (28.9 g., 0.20 mole), and ethanol (400 ml.) is treated with a solution of sodium hydroxide (8.0 g., 0.20 mole) in water (75 ml.), and heated under reflux for 1 hour, while a rapid stream of oxygen is introduced below its surface.

The mixture is filtered while hot, and the filtrate is poured into cold water (2.4 l.) containing sodium hydrosulfite (35 g.). The mixture is extracted repeatedly with ether, and the combined extracts are dried over a mixture of anhydrous magnesium sulfate and sodium hydrosulfite. The ether is evaporated under reduced pressure, and the residue is heated for a time in high vacuum at 120° to free it from any unreacted chlorohydroquinone. Crystallization of the residue from benzene gives 8-fluoro-3-phenothiazinol.

When other 4-substituted 2-aminobenzenethiols such as 2-amino-4-bromobenzenethiol, 2 - amino-4-methoxybenzenethiol, 2-amino-4-methylthiobenzenethiol, 2-amino-4-nitrobenzenethiol or 2-amino-4-propylbenzenethiol are used in place of 2-amino-4-fluorobenzenethiol in the above example, the corresponding 8-substituted 3-phenothiazinols (2-substituted-7-hydroxyphenothiazines) are obtained.

EXAMPLE 12

8-fluoro-2-hydroxyphenothiazine-3-carboxylic acid 8-fluoro-2-phenothiazolinol is carbonated according to the procedure of Example 5; 8-fluoro-2-hydroxyphenothiazine-3-carboxylic acid is obtained.

When 2-phenothiazinol, 8-chloro-2-phenothiazinol, or any of the 2-phenothiazinols of Example 10 is used in place of 8-fluoro-2-phenothiazinol in the above example, the corresponding 2-hydroxyphenothiazine-3-carboxylic acid is obtained.

When 3-phenothiazinol, 7-amino-3-phenothiazinol, 7-chloro-3-phenothiazinol, 7-dimethylaminoethoxy-3-phenothiazinol, 7-ethoxy-3-phenothiazinol, 7-methoxy-3-phenothiazinol, 7-methyl-3-phenothiazinol or any of the 3-phenothiazinols of Examples 10 and 11 is used in place of 8-fluoro-2-phenothiazinol in the above example, the corresponding 3-hydroxyphenothiazine-2-carboxylic acid is obtained.

EXAMPLE 13

2-bromo-4-fluoro-4'-methoxy-2'-nitrodiphenyl ether

A mixture of 2-bromo-4-fluorophenol (28.7 g., 0.15 mole), 4-chloro-3-nitroanisole (24.4 g., 0.13 mole), and water (1.0 ml.) is warmed to 50°, and then is treated with solid potassium hydroxide (8.4 g., 0.15 mole), added in several small portions with stirring. The temperature is raised to 105–110°, and stirring is continued for 3 hours.

The cooled reaction mixture is diluted with benzene and water, stirred thoroughly, and the layers separated. The benzene layer is dried over anhydrous magnesium sulfate, filtered, and evaporated under reduced pressure. Crystallization of the residue from acetone-hexane or ethyl acetate-hexane mixtures affords 2-bromo-4-fluoro-4'-methoxy-2'-nitrodiphenyl ether.

When 3-chloro-4-nitroanisole is used in place of 4-chloro-3-nitroanisole in the above example, 2-bromo-4-fluoro-5'-methoxy-2'-nitrodiphenyl ether is obtained.

Other 4-substituted o-bromophenols, such as 2-bromo-α-phenyl-p-cresol, 2,4-dibromophenol, 3-bromo-4-hydroxybenzoic acid and esters thereof, 2-bromo-4-chlorophenol, 2-bromo-4-cyclohexylphenol, 2-bromo-4-ethylphenol, 2-bromo-4-isopropylphenol, 2-bromo-p-cresol, 2-bromo-4-nitrophenol, 2-bromo-4-phenoxyphenol, and 2-bromo-4-phenylphenol, may be used in place of 2-bromo-4-fluorophenol in the above example; with 4-chloro-3-nitroanisole, the corresponding 4-substituted 2-bromo-4'-methoxy-2'-nitrodiphenyl ethers are obtained; with 3-chloro-4-nitroanisole, the corresponding 4-substituted 2-bromo-5'-methoxy-2'-nitrodiphenyl ethers are obtained.

Furthermore, 2-bromo-4-methoxyphenol may be used in place of 2-bromo-4-fluorophenol with 5-substituted 2-chloronitrobenzenes other than 4-chloro-3-nitroanisole; for example, when 4-chloro-3-nitrobenzotrifluoride is used in place of 4-chloro-3-nitroanisole, and 2-bromo-4-methoxyphenol in place of 2-bromo-4-fluorophenol in the above example, 2-bromo-4-methoxy-2'-nitro-4'-trifluoromethyldiphenyl ether is obtained. Similarly, 2,5-dichloronitrobenzene, 2-chloro-5-fluoronitrobenzene, and 4-chloro-3-nitrotoluene may be used in place of 4-chloro-3-nitrobenzotrifluoride; the corresponding 4'-substituted 2-bromo-4-methoxy-2'-nitrodiphenyl ethers are obtained.

EXAMPLE 14

8-fluoro-2-phenoxazinol 2-bromo-4-fluoro-4'-methoxy-2'-nitrodiphenyl ether is reduced with stannous chloride according to the procedure of Example 7. The resulting 2'-amino-2-bromo-4-fluoro-4'-methoxydiphenyl ether is cyclized in refluxing dimethylformamide with potassium carbonate and copper powder by the procedure of Example 9. The product, 8-fluoro-2-methoxyphenoxazine, is demethylated with pyridine hydrochloride according to Example 10 to give 8-fluoro-2-phenoxazinol.

Iron filings in acetic acid may be used in place of stannous chloride as reducing agent in the preparation of the intermediate 2'-amino-2-bromo-4-fluoro - 4' - methoxydiphenyl ether.

Prior N-formylation of this intermediate (cf. Example 8) facilitates the cyclization step; the product in this case is 7-fluoro-2-methoxyphenoxazine (via concomitant Smiles rearrangement, cf. Example 9), demethylated to 7-fluoro-2-phenoxazinol.

When 2 - bromo-4-fluoro-5'-methoxy-2'-nitrodiphenyl ether is used in place of 2-bromo-4-fluoro-4'-methoxy-2'-nitrodiphenyl ether in the above example, 8-fluoro-3-phenoxazinol (2-fluoro-7-hydroxyphenoxazine) and, by rearrangement of the 2'-formamido intermediate, 7-fluoro-3-phenoxazinol are obtained. Because of their extreme susceptibility to oxidation, the last-named products are handled and stored in an inert atmosphere (or are converted to their more stable o-acetyl derivatives (cf. Example 16).

When the substituted 2-bromo-2'-nitrodiphenyl ethers of Example 13 are subjected to the sequence of reactions of the above example, the corresponding phenoxazinol derivatives are obtained (except in the case of the 4-nitro compounds, which give the 7- and 8-aminophenoxazinols).

EXAMPLE 15

8-fluoro-3H-phenoxazin-3-one

Ferric chloride hexahydrate (21.6 g., 0.08 mole) is dissolved with warming in ethanol (120 ml.) and water (60 ml.), and the solution is poured into boiling water (640 ml.). This solution in turn is added, with stirring, to a boiling ethanolic solution of 2-fluorophenoxazine (4.0 g., 0.02 mole). The reaction mixture is heated for 2 minutes on the steam-bath and then is cooled thoroughly in ice. 8-fluoro-3H-phenoxazin-3-one is collected by filtration, and washed with cold water.

When 2-bromophenoxazine, 2-carboethoxyphenoxazine, 2-chlorophenoxazine, 2-N,N-dimethylsulfonamidophenoxazine, or 2-trifluoromethylphenoxazine is used in place of 2-fluorophenoxazine in the above example, the corresponding 8-substituted 3H-phenoxazin-3-one is obtained.

Nitrous acid may be used in place of ferric chloride as oxidant in the above example.

EXAMPLE 16

7-acetoxy-2-fluorophenoxazine

A solution of 8-fluoro-3H-phenoxazin-3-one (2.2 g., 0.01 mole) in acetic anhydride (60 ml.) and pyridine (3 ml.) is shaken with an excess of zinc dust for 15 minutes at room temperature. The mixture is then heated for 3 minutes at 100°, separated from excess zinc by decantation, and poured onto ice.

The mixture is extracted repeatedly with chloroform, and the combined extracts are washed with saturated aqueous sodium bicarbonate and water, dried over anhydrous sodium sulfate, filtered, and evaporated in vacuo. Crystallization of the residue from benzene-petroleum ether gives 7-acetoxy-2-fluorophenoxazine.

When 7-acetamido-3H-phenoxazin-3-one, 7-(2-bromoethoxy)-3H-phenoxazin-3-one, 7-ethoxy-3H-phenoxazin-3-one, 7-methoxy-3H-phenoxazin-3-one or the 8-substituted 3H-phenoxazin-3-ones of Example 15 are used in place of 8-fluoro-3H-phenoxazin-3-one in the above example, the corresponding 7-substituted 3-acetoxyphenoxazines or 2-substituted 7-acetoxyphenoxazines, respectively, are obtained.

Other reductive methods may be applied to the 3H-phenoxazin-3-ones (e.g. zinc in acetic acid, methanolic ascorbic acid, aqueous sodium hydrosulfite); these methods provide the corresponding 3-phenoxazinols, which are less stable than the acetyl derivatives of the example.

EXAMPLE 17

8-fluoro-2-hydroxyphenoxazine-3-carboxylic acid 8-fluoro-2-phenoxazinol is carbonated according to the procedure of Example 5; 8-fluoro-2-hydroxyphenoxazine-3-carboxylic acid is obtained.

When the substituted 2-phenoxazinols of Example 14 are used in place of 8-fluoro-2-phenoxazinol in the above example, the corresponding substituted 2-hydroxyphenoxazine-3-carboxylic acids are obtained.

When the 3-phenoxazinols of Examples 14 and 16 or derived by alkaline hydrolysis of the 3- and 7-acetoxyphenoxazines of Example 16 are used in place of 8-fluoro-2-phenoxazinol in the above example, the corresponding 3-hydroxyphenoxazine-2-carboxylic acids are obtained.

EXAMPLE 18

6-fluoro-2-methoxyacridine (a) 6-fluoro-2-methoxy-9-tosylhydrazoacridine hydrochloride.—Cold saturated solutions of p-toluenesulfonylhydrazide (3.7 g., 0.02 mole) and 9-chloro-6-fluoro-2-methoxyacridine (5.2 g., 0.02 mole) in chloroform are mixed, and allowed to stand for 2 days at room temperature. The adduct, 6-fluoro-2-methoxy-9-tosylhydrazoacridine hydrochloride, is then collected by filtration, and air-dried.

(b) 6-fluoro-2-methoxyacridine.—The adduct (4.5 g., 0.01 mole) is taken up in a solution of sodium carbonate (10.6 g., 0.10 mole) in water (240 ml.) and ethylene glycol (560 ml.), and the mixture is heated at 100–110° until nitrogen evolution ceases (2–3 hours). The mixture is then poured into twice its volume of water, and chilled thoroughly.

Solid material is collected by filtration, and extracted repeatedly with 1 N hydrochloric acid. The combined extracts are poured into an excess of cold aqueous ammonia, and the 6-fluoro-2-methoxyacridine is filtered off.

When 5-bromo-9-chloro-2-methoxyacridine, 6-bromo-9-chloro-2-methoxyacridine, 6,9-dichloro-7-nitro-2-methoxyacridine, 9-chloro-6-cyano-2-methoxyacridine, 9-chloro-6-iodo-2-methoxyacridine, 9-chloro-6-methyl-2-methoxyacridine, 9-chloro-6-sulfonamido-2-methoxyacridine, -7-bromo-9-chloro-2-methoxyacridine, -7,9-dichloro-2-methoxyacridine, 9-chloro-7-cyano-2-methoxyacridine, 9-chloro-7-iodo-2-methoxyacridine, 9-chloro-7-nitro-2-methoxyacridine, 9-chloro-7-sulfonamido-2-methoxyacridine, 9-chloro-7-N,N-dimethylsulfonamido-2-methoxyacridine, 8-bromo-9-chloro-2-methoxyacridine, 8,9-dichloro-2-methoxyacridine, 5,9-dichloro-3-methoxyacridine, 6-bromo-9-chloro-3-methoxyacridine, 6,9-dichloro-3-methoxyacridine, 7,9-dichloro-3-methoxyacridine, 7,9-dichloro-6-nitro-3-methoxyacridine, 9-chloro-7-iodo-3-methoxyacridine, and 8,9-dichloro-3-methoxyacridine are used in place of 9-chloro-6-fluoro-2-methoxyacridine in the above example, the corresponding 2- and 3-methoxyacridines unsubstituted at position 9 are obtained.

Furthermore, since 9-chloroacridines can be prepared readily from the corresponding 9-acridanones by the action of phosphorus oxychloride, the above example provides for the conversion of substituted 9-acridanones such as 7-amino-2-methoxy-9-acridanone, 6,8-dibromo-2-methoxy-9-acridanone, 5,7-dinitro-2-methoxy-9-acridanone and 7-methoxy-9-acridanone-3-carboxylic acid to the required substituted methoxyacridines.

Substituted 2- and 3-methoxyacridines (unsubstituted at position 9) are also available by oxidation of the corresponding substituted 2- and 3-methoxyacridans (Example 19). Oxidants useful for this purpose include potassium dichromate in dilute sulfuric acid, ferric chloride in dilute hydrochloric acid, and nitrous acid.

EXAMPLE 19

6-fluoro-2-methoxyacridan

A solution of 9-chloro-6-fluoro-2-methoxyacridan (2.6 g., 0.01 mole) in methanol (700 ml.) is treated with a solution of potassium hydroxide (0.56 g., 0.01 mole) in methanol (100 ml.). Raney-nickel catalyst (2.6 g.) is added, and the mixture is shaken with hydrogen at atmospheric pressure and room temperature until the calculated quantity of hydrogen is taken up.

The catalyst is removed by filtration and washed thoroughly with hot methanol. The combined filtrate and washings are evaporated to dryness in vacuo, and the residue is triturated with water in a mortar to dissolve potassium chloride. The mixture is filtered, and the collected 6-fluoro-2-methoxyacridan is washed with water and dried.

The substituted 9-chloro-2- and 3-methoxyacridines of Example 18 may be used in place of 9-chloro-6-fluoro-2-methoxyacridine in the above example; except where easily reducible groups are present (e.g. cyano, nitro), the corresponding substituted 2- and 3-methxoyacridans are obtained.

Furthermore, 6-amino-9-chloro-3-methoxyacridine, 6-amino-9-chloro-2-methoxyacridine, 5,9-dichloro-2-methoxyacridine and 9-chloro-2-methoxy-8-nitroacridine may be converted to the corresponding methoxyacridans by the procedure of the above example.

Substituted 2- and 3-methoxyacridans may also be prepared by reduction of the corresponding 9-hydroxy derivatives (9-acridanones) by means of sodium in amyl alcohol.

EXAMPLE 20

7-chloro-9,9-dimethyl-3-methoxyacridan

A solution of 7-chloro-3-methoxy-9-acridanone (13.0 g., 0.05 mole) in dry di-n-butyl ether (100 ml.) is added slowly dropwise to a stirred, refluxing mixture of methyl magnesium bromide (freshly prepared from magnesium turnings (3.6 g., 0.15 g.-atom and excess methyl bromide) in dry di-n-butyl ether (100 ml.). When the addition is complete, the mixture is refluxed for several hours.

After being cooled, the reaction mixture is treated carefully with water (250 ml.) and then with glacial acetic acid (20 ml.). The layers are separated, and the organic phase is washed with water, dried over anhydrous magnesium sulfate, filtered, and evaporated under reduced pressure. The residue is distilled in vacuo to give 7-chloro-9,9-dimethyl-3-methoxyacridan.

When the substituted 2- and 3-methoxy-9-acridanones of Examples 18 and 19 are used in place of 7-chloro-3-methoxy-9-acridanone in the above example, the corresponding substituted 9,9-dimethyl-2-and 3-methoxyacridans are obtained.

Other 9,9-dialkyl-2-and 3-methoxyacridans may be obtained by the procedure of the above example by substituting the appropriate alkyl grignard reagent for methyl magnesium bromide. Phenyl magnesium bromide gives the 9,9-diphenyl derivatives.

EXAMPLE 21

6-fluoro-2-methoxy-10-n-propylacridan

Sodamide (1.0 g., 0.026 mole) is suspended in a solution of 6-fluoro-2-methoxyacryidan (6.0 g., 0.026 mole) in dry benzene (100 ml.), and the mixture is heated under reflux with stirring for 2 hours; then there is added a solution of n-propyl bromide (3.6 g., 0.029 mole) in benzene (50 ml.), portionwise and with continued stirring. When the addition is complete, refluxing is continued for 15 hours.

The mixture is cooled, and treated carefully with water (100 ml.). The layers are separated, and the organic phase is washed with water, dried over potassium hydroxide, filtered, and evaporated under reduced pressure. The residue is fractionated in vacuo to give 6-fluoro-2-methoxy-10-n-propylacridan.

When 6-chloro-2-methoxyacridan, 7-chloro-2-methoxyacridan, 6-chloro-9,9-dimethyl-2-methoxyacridan, 9,9-diphenyl-2-methoxyacridan, 9,9-dimethyl-3-methoxyacridan or the 2- and 3-methoxyacridan derivatives of Examples 19 and 20 are used in place of 6-fluoro-2-methoxyacridan in the above example, the corresponding 10-n-propyl derivatives are obtained.

Similarly, 10-alkyl derivatives of the substituted 2- and 3-methoxyacridans are obtained by substitution of the appropriate alkyl halide for n-propyl bromide in the above example.

EXAMPLE 22

6-fluoro-2-acridinol 6-fluoro-2-methoxyacridine is demethylated by means of any of the three standard procedures: (a) 2-fold excess of aluminum chloride in refluxing xylene, (b) pyridine hydrochloride at 200° (cf. Example 10), (c) refluxing 48% hydrobromic acid (cf. Example 3); 6-fluoro-2-acridinol is obtained.

When 6-amino-2-methoxyacridine, 5-chloro-2-methoxyacridine, 6-chloro-2-methoxyacridine, 7-fluoro-9-methyl-2-methoxyacridine, 9-methyl-2-methoxyacridine, 6-nitro-2-methoxyacridine, 8-nitro-2-methoxyacridine, 6-nitro-3-methoxyacridine or any of the substituted 2- or 3-methoxyacridines of Example 18 is used in place of 6-fluoro-2-methoxyacridine in the above example, the corresponding substituted 2- or 3-acridinol is obtained.

Acridinols may also be obtained from the corresponding aminoacridines by treatment with concentrated hydrochloric acid at 160–200° for ca. 2 hours. 2-amino-5-nitroacridine, 6-aminoacridine-2-carboxylic acid, and 6-aminoacridine-2-sulfonic acid are converted to the corresponding acridinols by this procedure.

When the substituted 3-methoxyacridans of Examples 20 and 21 and the substituted 2-methoxyacridans of Example 21 (plus 2-methoxy-10-methylacridan) are used in place of 6-fluoro-2-methoxyacridine in the above example, the corresponding substituted acridanols are obtained.

The 2-methoxyacridan derivatives of Examples 19 and 20 (lacking a 10-alkyl substituent) and the 3-methoxyacridan derivatives of Example 10 (lacking alkyl substituents at $C_9$) are also demethylated according to the procedure of the above example.

EXAMPLE 23

6-fluoro-2-hydroxyacridine-1-carboxylic acid

6 - fluoro - 2 - acridinol is carbonated according to the procedure of Example 5; 6-fluoro-2-hydroxyacridine-1-carboxylic acid is obtained.

When 2-acridinol or any of the substituted 2-acridinols of Example 22 is used in place of 6-fluoro-2-acridinol in the above example, 2-hydroxyacridine-1-carboxylic acid or the corresponding substituted 2-hydroxyacridine-1-carboxylic acid is obtained.

When 3-acridinol, 6-amino-3-acridinol, or any of the substituted 3-acridinols of Example 22 is used in place of 6-fluoro-2-acridinol in the above example, 3-hydroxyacridine-4-carboxylic acid, 6-amino-3-hydroxyacridine-4-carboxylic acid, or the corresponding substituted 3-hydroxyacridine-4-carboxylic acid is obtained.

When 7-amino-9,9-dimethyl-2-acridanol or any of the substituted 2-acridanols of Example 22 is used in place of 6-fluoro-2-acridinol in the above example, 7-amino-9,9-dimethyl-2-hydroxyacridan-3-carboxylic acid or the corresponding substituted 2-hydroxyacridan-3-carboxylic acid is obtained.

When 7-methyl-9-phenyl-3-acridanol or any of the substituted 3-acridanols of Example 22 is used in place of 6 - fluoro-2-acridinol in the above example, 7-methyl-9-phenyl - 3-hydroxyacridan-2-carboxylic acid or the corresponding substituted 3-hydroxyacridan-2-carboxylic acid is obtained.

EXAMPLE 24

2-(p-fluorophenoxy)-5-nitrobenzenesulfinic acid p-Fuorophenol (5.6 g., 0.05 mole) is dissolved in 1 N aqueous sodium hydroxide (50 ml.) and the solution is heated under reflux. To the refluxing solution is slowly added a solution of 2-chloro-5-nitrobenzenesulfinic acid (11.1 g., 0.05 mole) in 1 N aqueous sodium hydroxide (50 ml.). When the addition is complete, anhydrous sodium carbonate (20 g.) and a trace of copper powder are added to the mixture, and refluxing is continued for 4 hours.

The reaction mixture is allowed to cool, and then is filtered and acidified with 80% sulfuric acid. After thorough chilling, 2-(p-fluorophenoxy)-5-nitrobenzenesulfinic acid is collected by filtration, and washed with cold water. It is purified by recrystallization from aqueous alcohol.

When the following substituted phenols are used in place of p-fluorophenol in the above example, the corresponding 2 - (substituted phenoxy)-5-nitrobenzenesulfinic acids are obtained: o-, m-, and p-bromophenol, o- and m-chlorophenol, o- and m-cresol, o- and m-fluorophenol, o-, m-, and p-hydroxybenzotrifluoride, m- and p-hydroxybenzoic acids, p-iodophenol, p-(methylmercapto)phenol, o- and m-methoxyphenol, o- and p-phenylphenol, salicylic acid.

When m-methoxyphenol or hydroquinone monomethyl ether (p-methoxyphenol) is used in place of p-fluorophenol, and the following 5-substituted 2-halobenzenesulfinic acids are used in place of 2-chloro-5-nitrobenzenesulfinic acid in the above example, the corresponding 5-substituted 2-(m- or p-methoxyphenoxy) benzenesulfinic acids, respectively, are obtained: 2 - bromo - 5-fluorobenzenesulfinic acid, 2,5-dibromobenzenesulfinic acid, and 2,5-dichlorobenzenesulfinic acid.

Similarly, when the following substituted thiophenols are used in place of p-fluorophenol in the above example, the corresponding 2'-, 3'-, or 4'-substituted 4-nitro-2-sulfinodiphenyl sulfides are obtained (the reaction, however, is more facile, and the sodium carbonate and copper powder may be conveniently omitted, and the extended reflux period considerably shortened): p-bromothiophenol, p-fluorothiophenol, o-mercaptobenzoic acid, p-methoxybenzenethiol, m-trifluoromethylthiophenol.

When p-methoxybenzenethiol is used in place of p-fluorophenol, and the 5 - substituted 2-halobenzenesulfinic acids cited above are used in place of 2-chloro-5-nitrobenzenesulfinic acid in the above example, the corresponding 4-substituted 4'-methoxy-2-sulfinodiphenyl sulfides are obtained.

EXAMPLE 25

8-fluoro-2-nitrophenoxathiin

An ice-cold suspension of 2-(p-fluorophenoxy)-5-nitrobenzenesulfinic acid (5.9 g., 0.02 mole) in acetic anhydride (24 ml.) is treated carefully with concentrated sulfuric acid (24 ml.). The mixture is then heated at 80° for 30 minutes.

The cooled mixture is poured over crushed ice and allowed to stand overnight in the cold. The precipitated solid is collected by filtration, washed thoroughly with dilute aqueous sodium hydroxide and with water, and dried.

The product, which is a mixture of 8-fluoro-2-nitrophenoxathiin and its 10-monoxide, is taken up in glacial acetic acid (20 ml.), and the solution is treated with hydrobromic acid (2.5 ml.). After being warmed on the steam-bath for 2 hours, the mixture is diluted with water and chilled thoroughly, 8-fluoro-2-nitrophenoxathiin is collected by filtration and washed well with cold water.

When the 2 - (o-substituted phenoxy)-5-nitrobenzenesulfinic acids of Example 24 are used in place of 2-(p-fluorophenoxy)-5-nitrobenzenesulfinic acid in the above example, the corresponding 6-substituted 2-nitrophenoxathiins are obtained.

Similarly, the 2-(m- and p-substituted phenoxy)-5-nitrobenzenesulfinic acids of Example 24 give the corresponding 7- and 8-substituted 2-nitrophenoxathiins, respectively.

When the 5-substituted 2-(m- or p-methoxyphenoxy) benzenesulfinic acids of Example 24 are used in place of 2 - (p-fluorophenoxy)-5-nitrobenzenesulfinic acid in the above example, the corresponding 2-substituted 7- or 8-methoxyphenoxathiins, respectively, are obtained.

EXAMPLE 26

8-fluoro-2-nitrothianthrene

Finely-powdered 4'-fluoro-4-nitro-2-sulfinodiphenyl sulfide (6.3 g., 0.02 mole) is dissolved by addition in small portions to concentrated sulfuric acid (25 ml.) at room temperature. The solution is allowed to stand for 3 hours at room temperature, and then is poured cautiously into cold water (175 ml.). After thorough chilling, the crude 8 - fluoro - 2 - nitrothianthrene is collected by filtration, washed with dilute aqueous sodium hydroxide and water, and dried.

8-fluoro-2-nitrothianthrene 10-monoxide present in the crude product is converted to 8-fluoro-2-nitrothianthrene by treatment with hydrogen bromide in acetic acid according to the procedure of Example 25. Dilution with water gives 8-fluoro-2-nitrothianthrene, which, after thorough chilling, is collected by filtration and washed with cold water.

When the 2'-, 3'-, or 4'-substituted 4-nitro-2-sulfinodiphenyl sulfides of Example 24 are used in place of 4'-fluoro-4-nitro-2-sulfinodiphenyl sulfide in the above example, the corresponding 6-, 7-, or 8-substituted 2-nitrothianthrenes, respectively, are obtained.

When the 4-substituted 4'-methoxy-2-sulfinodiphenylsulfides of Example 24 are used in place of 4'-fluoro-4-nitro-2-sulfinodiphenyl sulfide in the above example, the corresponding 8-substituted 2-methoxythianthrenes are obtained.

EXAMPLE 27

8-fluoro-2-nitrophenoxathiin 10,10-dioxide 8-fluoro-2-nitrophenoxathiin (1.8 g., 0.007 mole) is suspended in a solution of chromic acid (2.0 g., 0.02 mole) in glacial acetic acid (100 ml.), and the mixture is heated under reflux for 1 hour.

The cooled mixture is poured into water (100 ml.). After thorough chilling, 8-fluoro-2-nitrophenoxathiin 10,10-dioxide is collected by filtration, and washed with cold water; it is purified by recrystallization from aqueous acetic acid.

When the 6-, 7-, or 8-substituted 2-nitrophenoxathiins or 2-substituted 7- or 8-methoxyphenoxathiins of Example 25 are used in place of 8-fluoro-2-nitrophenoxathiin in the above example, the corresponding 10,10-dioxides are obtained, except in cases where easily oxidized substituents, are present, e.g. 8-methylmercapto-2-nitrophenoxathiin gives 8 - methylsulfonyl - 2 - nitrophenoxathiin 10,10-dioxide.

When the 6-, 7-, or 8-substituted 2-nitrothianthrenes or 8-substituted 2-methoxythianthrenes of Example 26 are used in place of 8-fluoro-2-nitrophenoxathiin in the above example, the corresponding 5,5,10,10-tetroxides are obtained.

EXAMPLE 28

2-amino-8-fluorothianthrene

A mixture of 8-fluoro-2-nitrothianthrene (5.6 g., 0.02 mole), concentrated hydrochloric acid (50 ml.), tin (23.7 g., 0.2 g.-atom), and ethanol (15 ml.) is heated under reflux for 4 hours.

The mixture is then thoroughly chilled, and the separated solid collected by filtration. The collected solid is warmed with an excess of aqueous 10% sodium hydroxide, the mixture cooled, and the 2-amino-8-fluorothianthrene collected by filtration, washed with cold water, and recrystallized from aqueous ethanol.

When 6,9-dichloro-2-nitrothianthrene, 6,8-dimethyl-2-nitrothianthrene, or any of the 6-, 7-, or 8-substituted 2-nitrothianthrenes of Example 26 is used in place of 8-fluoro-2-nitrothianthrene in the above example, the corresponding substituted 2-aminothianthrene is obtained.

When the 6-, 7-, or 8-substituted 2-nitrophenoxathiins of Example 25 are used in place of 8-fluoro-2-nitrothianthrene in the above example, the corresponding substituted 2-aminophenoxathiins are obtained.

When 8-chloro-2-nitrophenoxathiin 10,10-dioxide, 8-methoxy-2-nitrophenoxathiin 10,10-dioxide, or any of the 6-, 7-, or 8-substituted 2-nitrophenoxathiin 10,10-dioxides of Example 27 is used in place of 8-fluoro-2-nitrothianthrene in the above example, the corresponding substituted 2-aminophenoxathiin 10,10-dioxide is obtained.

When 8-chloro-2-nitrothianthrene 5,5,10,10-tetroxide, 6,9 - dichloro - 2 - nitrothianthrene 5,5,10,10-tetroxide, 8-methyl-2-nitrothianthrene 5,5,10,10-tetroxide, or any of the 6-, 7-, or 8-substituted 2-nitrothianthrene 5,5,10,10-tetroxides of Example 27 is used in place of 8-fluoro-2-nitrothianthrene in the above example, the corresponding substituted 2 - aminothianthrene 5,5,10,10 - tetroxide is obtained.

EXAMPLE 29

8-fluoro-2-thianthrenol

To an ice-cold solution of 2-amino-8-fluorothianthrene (5.0 g., 0.02 mole) in 2 N sulfuric acid (30 ml.) is added sodium nitrite (1.4 g., 0.02 mole) in small portions. The mixture is allowed to warm gradually to room temperature, and then is warmed on the steam-bath at ca. 60° until evolution of nitrogen ceases. The mixture is then chilled thoroughly, and 8-fluoro-2-thianthrenol is collected by filtration and washed with cold water.

When 2 - amino - 8 - chlorothianthrene, 2-amino-7,8-dimethoxythianthrene, 2 - amino-6-methoxy-9-methylthianthrene, 2 - amino - 8 - methylthianthrene, 2-amino-8-nitrothianthrene, 2-aminothianthrene-7-carboxylic acid or any of the substituted 2-aminothianthrenes of Example 28 is used in place of 2-amino-8-fluorothianthrene in the example above, the corresponding substituted 2-thianthrenol is obtained.

When 2-amino - 8 - chlorophenoxathiin, 2-amino-8-methoxyphenoxathiin, 2 - amino - 8 - methylphenoxathiin, or any of the substituted 2-aminophenoxathiins of Example 28 is used in place of 2-amino-8-fluorothianthrene in the above example, the corresponding substituted 2-phenoxathiinol is obtained.

When 2-aminophenoxathiin 10,10-dioxide, 2-amino-8-methylphenoxathiin 10,10-dioxide, or any of the substituted 2-aminophenoxathiin 10,10-dioxides of Example 28 is used in the above example in place of 2-amino-8-fluorothianthrene, the corresponding 2 - phenoxathiinol 10,10-dioxide is obtained.

When the substituted 2-aminothianthrene 5,5,10,10-tetroxides of Example 28 are used in place of 2-amino-8-fluorothianthrene in the above example, the corresponding substituted 2-thianthrenol 5,5,10,10-tetroxides are obtained.

When 3-aminophenoxathiin and 3-aminophenoxathiin 10,10-dioxide are used in place of 2-amino-8-fluorothianthrene in the above example, 3-phenoxathiinol and 3-phenoxathiinol 10,10-dioxide, respectively, are obtained.

Thianthrenols and phenoxathiinols may also be prepared by demethylation of the corresponding methoxythianthrenes and methoxyphenoxathiins (cf. Example 30), and by hydrolysis of the corresponding halothianthrenes and halophenoxathiins. By means of the latter reaction, halothianthrenes such as 2-chloro-8-nitrothianthrene, 8-amino-2-chlorothianthrene, and 2-chloro-8-methoxythianthrene, and halophenoxathiins such as 2-chloro - 8 - nitrophenoxathiin, 8-amino-2-chlorophenoxathiin, 2-bromo - 7 - methoxyphenoxathiin, 2-chloro-8-methoxyphenoxathiin, 8-benzyl-2-chlorophenoxathiin, and 2-chloro-8-ethylphenoxathiin give the corresponding substituted 2-thianthrenols and 2-phenoxathiinols, respectively.

EXAMPLE 30

8-fluoro-3-phenoxathiinol 2-fluoro-7-methoxyphenoxathiin (4.5 g., 0.018 mole) and 30% hydrogen bromide in acetic acid (15 ml.) are heated together in a closed vessel for 5 hours at 100°.

The reaction mixture is then evaporated to dryness in vacuo, and the residue is taken up in an excess of dilute aqueous sodium hydroxide. The alkaline mixture is filtered, and the filtrate is acidified with hydrochloric acid. After thorough chiling, 8-fluoro-3-phenoxathiinol is collected by filtration, and washed with cold water.

When 2-methoxy-3 - nitrophenoxathiin, 8-amino-2-methoxyphenoxathiin, or any of the 2-substituted 8-methoxyphenoxathiins (8-substituted 2-methoxyphenoxathiins) of Example 25 is used in place of 2-fluoro-7-methoxyphenoxathiin in the above example, the corresponding 8-substituted 2-phenoxathiinol is obtained.

When 2-amino-7-methoxyphenoxathiin or any of the 2-substituted 7-methoxyphenoxathiins (8-substituted 3-methoxyphenoxathiins) of Example 25 is used in place of 2-fluoro-7-methoxyphenoxathiin in the above example, the corresponding 8-substituted 3-phenoxathiinol is obtained.

When 8-amino-2-methoxythianthrene or any of the 8-substituted 2-methoxythianthrenes of Example 26 is used in place of 2-fluoro-7-methoxyphenoxathiin in the above example, the corresponding 8-substituted 2-thianthrenol is obtained.

When 2-methoxy-8-nitrophenoxathiin 10,10,-dioxide, 8-amino-2-methoxyphenoxathiin 10,10-dioxide, or any of the 2-substituted 8-methoxyphenoxathiin 10,10-dioxides of Example 27 is used in place of 2-fluoro-7-methoxyphenoxathiin in the above example, the corresponding 8-substituted 2-phenoxathiinol 10,10-dioxide is obtained.

When 2-amino-7-methoxyphenoxathiin 10,10-dioxide or any of the 2-substituted 7-methoxyphenoxathiin 10,10-dioxides of Examples 27 is used in place of 2-fluoro-7-methoxyphenoxathiin in the above example, the corresponding 8-substituted 3-phenoxathiinol 10,10-dioxide is obtained.

When 8-amino - 2 - methoxythianthrene 5,5,10,10-tetroxide or any of the 8-substituted 2-methoxythianthrene 5,5,10,10-tetroxides of Example 27 is used in place of 2-fluoro-7-methoxyphenoxathiin in the above example, the corresponding 8-substituted 2-thianthrenol 5,5,10,10-tetroxide is obtained.

EXAMPLE 31

8-fluoro-2-phenoxathiinol 10,10-dioxide

A mixture of 2-bromo-5-fluorobenzenesulfinic acid (28.7 g., 0.12 mole) and benzoquinone (10.8 g., 0.10 mole) in water (200 ml.) is heated at 70° with stirring for 30 minutes. The mixture is then rendered alkaline by the addition of an aqueous solution of sodium hydroxide (12.0 g., 0.30 mole), and heated in an autoclave at 135° for 5 hours.

The mixture is neutralized by means of hydrochloric acid, and chilled thoroughly; 8-fluoro-2-phenoxathiinol 10,10-dioxide is collected by filtration, and washed with cold water. It is purified further by recrystallization from alcohol or acetic acid.

When 2,5-dibromobenzenesulfinic acid, 2-chlorobenzenesulfinic acid, and 2-chloro-4,5-dimethoxybenzenesulfinic acid are used in place of 2-bromo-5-fluorobenzenesulfinic acid in the above example, 8-bromo-2-phenoxthiinol 10,10-dioxide, 2-phenoxathiinol-10,10-dioxide, and 7,8-dimethoxy-2-phenoxathiinol-10,10-dioxide, respectively, are obtained.

EXAMPLE 32

8-fluoro-3-phenoxathiinol 10-monoxide

A solution of 8-fluoro-3-phenoxathiinol (4.4 g., 0.02 mole) in glacial acetic acid (80 ml.) is treated with aqueous 30% hydrogen peroxide (1.7 ml., 0.02 mole), and then is allowed to stand for 24 hours at room temperature.

The reaction mixture is diluted with water, and chilled thoroughly. 8-fluoro-3-phenoxathiinol 10-monoxide is collected by filtration, and washed well with cold water.

When 2-phenoxathiinol or any of the 2- or 3-phenoxathiinols of Examples 29 and 30 is used in place of 8-fluoro-3-phenoxathiinol in the above example, the corresponding 10-monoxide is obtained.

When 2-thinathrenol or any of the substituted 2-thianthrenols of Examples 29 and 30 is used in place of 8-fluoro-3-phenoxathiinol in the above example, the corresponding 5- (or 10-) monoxide is obtained.

EXAMPLE 33

8-fluoro-2-hydroxyphenoxathiin-3-carboxylic acid 8-fluoro-2-phenoxathiinol is carbonated according to the procedure of Example 5; 8-fluoro-2-hydroxyphenoxathiin-3-carboxylic acid is obtained.

When 2-phenoxathiinol or any of the substituted 2-phenoxathiinols of Examples 29 and 30, any of the 2-phenoxathiinol 10-monoxides of Example 32, 8-amino-, 8-chloro-, or 8-nitro-2-phenoxathiinol 10,10-dioxide or any of the 2-phenoxathiinol 10,10-dioxides of Examples 29, 30, and 31 is used in place of 8-fluoro-2-phenoxathiinol in the above example, the corresponding 2-hydroxyphenoxathiin-3-carboxylic acid derivative is obtained.

When any of the 3-phenoxathiinols of Examples 29 and 30, any of the 3-phenoxathiinol 10-monoxides of Example 32, or any of the 3-phenoxathiinol 10,10-dioxides of Examples 29 and 30 is used in place of 8-fluoro-2-phenoxathiinol in the above example, the corresponding 3-hydroxyphenoxathiin-2-carboxylic acid derivative is obtained.

When 2-thianthrenol or any of the substituted 2-thianthrenols of Examples 29 and 30, any of the 2-thianthrenol 5- (or 10-) monoxides of Example 32, 2-thianthrenol 5,5,10,10-tetroxide, or any of the substituted 2-thianthrenol 5,5,10,10-tetroxides of Examples 29 and 30 is used in place of 8-fluoro-2-phenoxathiinol in the above example, the corresponding 2-hydroxythianthrene-3-carboxylic acid derivative is obtained.

EXAMPLE 34

2,2'-dimethoxy-4-fluoro-4'-nitrodiphenyl ether 4-fluoroguaiacol (21.3 g., 0.15 mole) and 2-bromo-5-nitroanisole (34.8 g., 0.15 mole) are reacted in the presence of potassium hydroxide (8.4 g., 0.15 mole) according to the procedure of Example 13; 2,2'-dimethoxy-4-fluoro-4'-nitrodiphenyl ether is obtained.

When 4 - bromoguaiacol, 4 - chloroguaiacol, 5 - chloroguaiacol, 4,5-dichloroguaiacol, 4,5-dimethylguaiacol, 4-ethylguaiacol, 5-ethylguaiacol, 4-isopropylguaiacol, 5-isopropylguaiacol, 4-methylguaiacol, 5-methylguaiacol, 4-phenoxyguaiacol, 5 - phenoxyguaiacol, 4 - cyclohexylguaiacol, 5-phenylguaiacol, 4-propylguaiacol and 5-propylguiaicol are used in place of 4-fluoroguaiacol in the above example, the corresponding substituted 2,2'-dimethoxy-4'-nitrodiphenyl ethers are obtained.

When 4-nitroguaiacol is used in place of 4-fluoroguaiacol and 2-bromo-4-chloroanisole, 2-bromo-4-cyclohexylanisole, 2-bromo-4-ethylanisole, 2-bromo-4-fluoroanisole, 2-bromo-4-isopropylanisole, 2-bromo-4-methylanisole, 2-bromo-4-phenylanisole, or 2-bromo-4-trifluoromethylanisole is used in place of 2-bromo-5-nitroanisole in the above example, the corresponding 5-substituted 2,2'-dimethoxy-4'-nitrodiphenyl ether is obtained.

When 4-nitroguaiacol is used in place of 4-fluoroguaiacol and 2-bromo-4,5-dimethylanisole, 2-bromo-4-ethyl-5-methylanisole, or 2-bromo-5-trifluoromethylanisole is used in place of 2-bromo-5-nitroanisole in the above example, 2,2'-dimethoxy-4,5-dimethyl-4'-nitrodiphenyl ether, 2,2'-dimethoxy-5-ethyl-4-methyl-4'-nitrodiphenyl ether, or 2,2'-dimethoxy-4'-nitro-4-trifluoromethyldiphenyl ether, respectively, is obtained.

When 5-nitroguaiacol is used in place of 4-fluoroguaiacol and the 4-substituted 2-bromoanisoles cited above are used in place of 2-bromo-5-nitroanisole in the above example, the corresponding 5-substituted 2,2'-dimethoxy-5'-nitrodiphenyl ethers are obtained.

When 5-nitroguaiacol is used in place of 4-fluoroguaiacol, and 2-bromo-4,5-dimethylanisole, 2-bromo-4-ethyl-5-methylanisole, or 2-bromo-5-trifluoromethylanisole is used in place of 2-bromo-5-nitroanisole in the above example, 2,2'-dimethoxy-4,5-dimethyl-5'-nitrodiphenyl ether, 2,2'-dimethoxy-5-ethyl-4-methyl-5'-nitrodiphenyl ether, or 2,2'-dimethoxy-5'-nitro-4-trifluoromethyldiphenyl ether, respectively, is obtained.

EXAMPLE 35

2,2'-dihydroxy-4-fluoro-4'-nitrodiphenyl ether 2,2'-dimethoxy-4-fluoro-4'-nitrodiphenyl ether (10.3 g., 0.035 mole) is demethylated with 30% hydrobromic acid in acetic acid (30 ml.) in accordance with the procedure of Example 30; 2,2'-dihydroxy-4-fluoro-4'-nitrodiphenyl ether is obtained.

When the substituted 2,2'-dimethoxydiphenyl ethers of Example 34 are used in place of 2,2'-dimethoxy-4-fluoro-4'-nitrodiphenyl ether in the foregoing example, the corresponding substituted 2,2'-dihydroxydiphenyl ethers are obtained.

EXAMPLE 36

8-fluoro-2-nitrodibenzo-p-dioxin 2,2'-dihydroxy-4-fluoro-4'-nitrodiphenyl ether (5.3 g., 0.02 mole) is cyclized on heating with an excess of 48% hydrobromic acid and a trace of red phosphorus in a sealed tube at 180°.

The reaction mixture is allowed to cool, diluted with water, and rendered alkaline with aqueous sodium hydroxide. The mixture is extracted repeatedly with ether, and the combined extracts are dried over anhydrous sodium sulfate, filtered, and evaporated in vacuo to give crude 8-fluoro-2-nitrodibenzo-p-dioxin. The crude material is purified by solution in benzene and chromatography of the solution on alumina. Appropriate chromatographic fractions are combined and evaporated in vacuo, and the residue recrystallized from aqueous ethanol or acetic acid to give pure 8-fluoro-2-nitrodibenzo-p-dioxin.

When the 4-substituted 2,2'-dihydroxy-4'-nitrodiphenyl ethers and 5-substituted 2,2'-dihydroxy-5'-nitrodiphenyl ethers of Example 35 are used in place of 2,2'-dihydroxy-4-fluoro-4'-nitrodiphenyl ether in the above example, the corresponding 8-substituted 2-nitrodibenzo-p-dioxins are obtained.

When the 5-substituted 2,2'-dihydroxy-4'-nitrodiphenyl ethers and 4-substituted 2,2'-dihydroxy-5'-nitrodiphenyl ethers of Example 35 are used in place of 2,2'-dihydroxy-4-fluoro-4'-nitrodiphenyl ether in the above example, the corresponding 7-substituted 2-nitrodibenzo-p-dioxins are obtained.

When 4,5-dichloro-2,2'-dihydroxy - 4' - nitrodiphenyl ether, 2,2' - dihydroxy-5-ethyl-4-methyl-4'-nitrodiphenyl ether, and 2,2'-dihydroxy-5-ethyl - 4 - methyl-5'-nitrodiphenyl ether is used in place of 2,2'-dihydroxy-4-fluoro-4'-nitrodiphenyl ether in the above example, 7,8-dichloro-2-nitrodibenzo-p-dioxin, 7-ethyl-8-methyl-2-nitrodibenzo-p-dioxin, or 8-ethyl-7-methyl-2-nitrodibenzo-p-dioxin, respectively, are obtained.

When either 2,2'-dihydroxy-4,5-dimethyl-4'-nitrodiphenyl ether or 2,2'-dihydroxy-4,5-dimethyl-5'-nitrodiphenyl ether is used in place of 2,2'-dihydroxy-4-fluoro-4'-nitrodiphenyl ether in the above example, 7,8-dimethyl-2-nitrodibenzo-p-dioxin is obtained.

7-chloro-, 7-fluoro-, and 7-iodo-2-nitrodibenzo-p-dioxin may be prepared by mild nitration (conc. HNO₃/HOAc, 50°, 10 min.) of the 2-halodibenzo-p-dioxins.

7- and 8-substituted 2-nitrodibenzo-p-dioxins may also be prepared by the following sequence of reactions: The initial step, formation of a 4- or 5-substituted 2-bromo-2'-methoxy-4'-nitrodiphenyl ether, is carried out as described in Example 34, but using a 4- or 5-substituted 2-bromophenol of Example 37 (vide infra) instead of a substituted guaiacol as co-reactant with 2-bromo-5-nitroanisole. The second step, demethylation, proceeds according to Example 35. Ring closure of the substituted 2-bromo - 2' - hydroxy - 4' - nitrodiphenyl ether then is effected in the presence of base (procedures such as described in Examples 9, 13, 34, 37).

EXAMPLE 37

7-fluoro-2-methoxydibenzo-p-dioxin

A mixture of 2-bromo-4-methoxyphenol (32.5 g., 0.16 mole), 2-bromo-4-fluorophenol (30.6 g., 0.16 mole), anhydrous potassium carbonate (22.0 g., 0.16 mole), and copper powder (2.4 g.) is heated in an oil-bath at 170–180° for 6 hours. The resulting tarry mixture is further refluxed with aqueous potassium hydroxide, allowed to cool, and finally extracted repeatedly with ether. The combined ether extracts are washed with concentrated aqueous potassium hydroxide and with water, dried over anhydrous magnesium sulfate, filtered, and evaporated in vacuo. The residue, a mixture containing the three possible condensation products, 2,7-dimethoxydibenzo-p-dioxin, 7-fluoro-2-methoxydibenzo-p-dioxin, and 2,7-difluorodibenzo-p-dioxin, is taken up in benzene, and the solution chromatographed on alumina. Chromatographic fractions containing the desired 7-fluoro - 2 - methoxydibenzo-p-dioxin are combined and evaporated in vacuo.

The compound may be further purified by recrystallization from aqueous alcohol or acetic acid.

2-bromo-4-fluorophenol may be replaced in the above example by any of the 4-substituted 2-bromophenols cited in Example 13; the corresponding 7-substituted 2-methoxydibenzo-p-dioxin is thereby obtained.

When 2-bromo-4-fluorophenol is replaced by 6-bromo-m-cresol, 6-bromo-4-ethyl-m-cresol, 2 - bromo - 5 - nitrophenol, and 6-bromo-α,α,α-trifluoro-m-cresol in the above example, 2-methoxy-8-methyldibenzo-p-dioxin, 7-ethyl-2-methoxy-8-methyldibenzo-p-dioxin, 2-methoxy-8 - nitrodibenzo-p-dioxin, and 2 - methoxy - 8 - trifluoromethyldibenzo-p-dioxin, respectively, are obtained.

EXAMPLE 38

2-amino-8-fluorodibenzo-p-dioxin

A solution of anhydrous tin (II) chloride (8.5 g., 0.045 mole) in concentrated hydrochloric acid (25 ml.) is added slowly to a refluxing solution of 8-fluoro-2-nitrodibenzo-p-dioxin (3.7 g., 0.015 mole) in glacial acetic acid (25 ml.). When the addition is complete, heating is continued for 10–15 minutes.

The mixture is cooled in ice, and rendered strongly basic with aqueous potassium hydroxide. 2-amino-8-fluorodibenzo - p - dioxin is collected by filtration, and washed thoroughly with cold water.

When 7,8-dibromo-2-nitrodibenzo - p - dioxin, 2-methoxy - 7 - nitrodibenzo - p - dioxin, 2 - methoxy - 8 - nitrodibenzo - p - dioxin, or any of the substituted 2-nitrodibenzo-p-dioxins of Example 36 is used in place of 8-fluoro-2-nitrodibenzo-p-dioxin in the above example, the corresponding substituted aminodibenzo-p-dioxin is obtained.

EXAMPLE 39

8-fluoro-2-hydroxydibenzo-p-dioxin 2-amino-8-fluorodibenzo - p - dioxin is diazotized, and the resulting diazonium salt decomposed thermally according to the procedure of Example 29; 8-fluoro-2-hydroxydibenzo-p-dioxin is obtained.

When 2-aminodibenzo-p-dioxin, 2 - amino - 7 - bromodibenzo-p-dioxin, or any of the substituted 2-aminodibenzo-p-dioxins of Example 38 is used in place of 2-amino-8-fluorodibenzo-p-dioxin in the above example, 2-hydroxydibenzo-p-dioxin, 7-bromo - 2 - hydroxydibenzo-p-dioxin, or the corresponding substituted 2-hydroxydibenzo-p-dioxin, respectively, is obtained.

EXAMPLE 40

7-fluoro-2-hydroxydibenzo-p-dioxin 7-fluoro-2-methoxydibenzo - p - dioxin is demethylated according to the procedure of Example 30; 7-fluoro-2-hydroxydibenzo-p-dioxin is obtained.

When 2-methoxydibenzo-p-dioxin, 7- or 8 - amino - 2-methoxydibenzo - p - dioxin, or any of the substituted 2-methoxydibenzo-p-dioxins of Example 37 is used in place of 7-fluoro-2-methoxydibenzo-p-dioxin in the above example, 2-hydroxydibenzo-p-dioxin, 7- or 8-amino-2-hydroxydibenzo-p-dioxin, or the corresponding substituted 2-hydroxydibenzo-p-dioxin, respectively, is obtained.

EXAMPLE 41

8-fluoro-2-hydroxydibenzo-p-dioxin-3-carboxylic acid 8-fluoro-2-hydroxydibenzo-p-dioxin is carbonated according to the procedure of Example 5; 8-fluoro-2-hydroxydibenzo-p-dioxin-3-carboxylic acid is obtained.

When the 2-hydroxydibenzo-p-dioxins of Examples 39 and 40 are used in place of 8-fluoro-2-hydroxydibenzo-p-dioxin in the above example, the corresponding 2-hydroxydibenzo-p-dioxin-3-carboxylic acids are obtained.

EXAMPLE 42

4-fluoro-2',4'-dimethylbenzophenone

To aluminum chloride (10 g.,) in m-xylene (10 ml.) is added p-fluorobenzoyl chloride (10 g.). The mixture is refluxed for 4 hours and treated with aqueous hydrochloric acid to give 4-fluoro-2',4'-dimethylbenzophenone.

EXAMPLE 43

4-fluorobenzophenone-2',4'-dicarboxylic acid

4 - fluoro-2',4'-dimethylbenzophenone is oxidized with potassium permanganate in boiling aqueous pyridine to produce 4-fluorobenzophenone-2',4'-dicarboxylic acid.

EXAMPLE 44

7-fluoroanthraquinone-2-carboxylic acid 4-fluorobenzophenone-2',4'-dicarboxylic acid is heated with 9% oleum for 3 hours at 140°; the mixture is then cooled and poured onto crushed ice. 7-fluoroanthraquinone-2-carboxylic acid is collected by filtration, and washed thoroughly with cold water.

Following the procedure of Examples 42–44, when o-bromobenzoyl chloride, p-bromobenzoyl chloride, o-iodobenzoyl chloride, p-iodobenzyl chloride, o-methoxybenzoyl chloride, p-nitrobenzoyl chloride, o-trifluoromethylbenzoyl chloride, or p-trifluoromethylbenzoyl chloride is used in place of p-fluorobenzoyl chloride, 5-bromo-, 7-bromo-, 5-iodo-, 7-iodo-, 5-methoxy-, 7-nitro-, 5-trifluoromethyl- or 7-trifluoromethylanthraquinone-2-carboxylic acid, respectively, is obtained.

When m-xylene is replaced by p-xylene, and p-fluorobenzoyl chloride is replaced by o-bromobenzoyl chloride, p-bromobenzoyl chloride, o-iodobenzoyl chloride, p-iodobenzoyl chloride, o-methoxybenzoyl chloride, p-methoxybenzoyl chloride, o-trifluoromethylbenzoyl chloride, or p-trifluoromethylbenzoyl chloride, 8-bromo-, 6-bromo, 8-iodo-, 6-iodo-, 8-methoxy-, 6-methoxy-, 8-trifluoromethyl- or 6-trifluoromethylanthraquinone-2-carboxylic acid, respectively, is obtained.

EXAMPLE 45

7-fluoroanthraquinone-2-carboxamide 7-fluoroanthraquinone-2-carboxylic acid is treated with thionyl chloride in benzene, and the resulting acid chloride treated with aqueous ammonia according to the procedure of Example 71 to produce 7-fluoroanthraquinone-2-carboxamide.

EXAMPLE 46

2-amino-7-fluoroanthraquinone 7-fluoroanthraquinone-2-carboxamide is then treated with bromine in aqueous potassium hydroxide for 3 hours at 75° C. to produce 2-amino-7-fluoroanthraquinone.

When 8-chloroanthraquinone-2-carboxylic acid, 5,7-dichloroanthraquinone-2-carboxylic acid, or any of the substituted anthraquinone-2-carboxylic acids of Example 44 is used in place of 7-fluoroanthraquinone-2-carboxylic acid in the procedures of Examples 45 and 46, the corresponding substituted 2-aminoanthraquinone is obtained.

EXAMPLE 47

7-fluoro-2-hydroxyanthraquinone 2-amino-7-fluoroanthraquinone is diazotized and the diazonium salt decomposed thermally according to the procedure of Example 29; 7-fluoro-2-hydroxyanthraquinone is obtained.

When 2-amino-5-, 6-, or 8-fluoroanthraquinone, 2-amino-7-chloroanthraquinone, 2 - amino-5-nitroanthraquinone, 7-aminoanthraquinone-2-carboxylic acid, 6-aminoanthraquinone-1-carboxylic acid, or any of the substituted 2-aminoanthraquinones of Example 46 is used in place of 2-amino-7-fluoroanthraquinone in the above example, 5-, 6-, or 8-fluoro-, 7-chloro-, 5-nitro-, 7-carboxy-, 5-carboxy-, or the corresponding substituted 2-hydroxyanthraquinone, respectively, is obtained.

5- or 8-amino-2-methoxyanthraquinone, 5- or 8-nitro-2-methoxyanthraquinone, 6 - amino-2-methoxyanthraquinone, 6-methoxyanthraquinone-2-carboxylic acid, or 6,7-dimethyl-2-methoxyanthraquinone may be demethylated according to the procedure of Example 30; the corresponding substituted 2-hydroxyanthraquinone is obtained.

EXAMPLE 48

7-fluoro-2-anthrol

To a refluxing solution of 7-fluoro-2-hydroxyanthraquinone (4.8 g., 0.02 mole) in alcohol (50 ml.) and water (100 ml.) is added washed aluminum-mercury couple (prepared from pure aluminum foil (1 g.) and mercuric chloride (1.5 g.) in water (75 ml.)), followed by concentrated ammonium hydroxide (40 ml.) added slowly during 10 minutes. The mixture is allowed to reflux an additional 30 minutes, and then the liquid is decanted, still hot, from unused couple into an excess of dilute hydrochloric acid. After thorough chilling, the 7-fluoro-2-anthrol is collected by filtration, and washed well with cold water.

When 5-chloro-, 6-chloro-, 5,8-dichloro-, 7-methoxy-, 6-methyl-, or 6-amino-2-hydroxyanthraquinone, or any of the substituted 2-hydroxyanthraquinones of Example 47 is used in place of 7-fluoro-2-hydroxyanthraquinone in the above example, the corresponding substituted 2-anthrol is obtained.

EXAMPLE 49

7-fluoro-2-hydroxy-9,10-dihydroanthracene

A mixture of 7-fluoro-2-anthrol (10.6 g., 0.05 mole), copper chromite catalyst (0.5 g.), and absolute ethanol (30 ml.) is heated to 150° in a bomb, and shaken at that temperature under a hydrogen pressure of 2000–2500 p.s.i. until the calculated quantity of hydrogen is taken up.

The catalyst is filtered from the alcoholic solution with the aid of Super-cel, and the filtrate is evaporated in vacuo to give 7-fluoro-2-hydroxy-9,10-dihydroanthracene.

When the substituted 2-anthrols of Example 48 are used in place of 7-fluoro-2-anthrol in the above example, the corresponding substituted 2 - hydroxy-9,10-dihydroanthracenes are obtained.

EXAMPLE 50

7-fluoro-2-hydroxyanthracene-3-carboxylic acid 7-fluoro-2-anthrol is carbonated according to the procedure of Example 5; 7-fluoro-2-hydroxyanthracene - 3-carboxylic acid is obtained.

When the substituted 2-anthrols of Example 48 or the substituted 2-hydroxy-9,10-dihydroanthracenes of Example 49 are used in place of 7-fluoro-2-anthrol in the above example, the corresponding 2-hydroxyanthracene-3-carboxylic acids or 2-hydroxy-9,10-dihydroanthracene-3-carboxylic acids, respectively, are obtained.

EXAMPLE 51

2,4-dimethyl-4'-fluoro-5-nitrobenzophenone

To an ice-cold solution of 2,4-dimethyl-4'-fluorobenzophenone (22.8 g., 0.10 mole) in concentrated sulfuric acid (15 g.) is slowly added a chilled mixture of nitric acid (d.=1.42, 10 g.) and concentrated sulfuric acid (15 g.); the mixture is stirred during the addition of the acid, and the temperature is maintained 30° by continued ice-cooling. When the addition is complete, the mixture is stirred for 10 hours at room temperature.

The organic phase is separated, and washed successively with water, dilute aqueous sodium carbonate, and water, dried over anhydrous sodium sulfate, filtered, and distilled in vacuo to give 2,4-dimethyl-4'-fluoro-5-nitrobenzophenone.

When 2,4-dimethyl-2'-fluorobenzophenone, 2'-chloro-2,4-dimethylbenzophenone, 4' - chloro-2,4-dimethylbenzophenone, 2'- and 4'-bromo-2,4-dimethylbenzophenone, 2,4-dimethyl-2'- and 4'-iodobenzophenone, 2,4-dimethyl-4'-nitrobenzophenone, 2,4-dimethyl-2'- and 4'-trifluoromethylbenzophenone are used in place of 2,4-dimethyl-4'-fluorobenzophenone in the above example, the corresponding 5-nitro derivatives are obtained.

When 2,5-dimethyl-2'-fluorobenzophenone, 2',4' - dichloro-2,5-dimethylbenzophenone, 2'- and 4'-bromo-2,5- dimethylbenzophenone, 2,5-dimethyl-2'- and 4'-iodobenzophenone, 2,5-dimethyl-2'- and 4'-trifluoromethylbenzophenone are used in place of 2,4-dimethyl-4'-fluorobenzophenone is the above example, the corresponding 4-nitro derivatives are obtained.

EXAMPLE 52

4'-fluoro-5-nitrobenzophenone-2,4-dicarboxylic acid 2,4-dimethyl-4'-fluoro-5-nitrobenzophenone is oxidized according to the procedure of Example 43; 4'-fluoro-5-nitrobenzophenone-2,4-dicarboxylic acid is obtained.

When the substituted 2,4-dimethyl-5-nitro- and 2,5-dimethyl-4-nitrobenzophenones of Example 51 are used in place of 2,4-dimethyl-4'-fluoro-5-nitrobenzophenone in the above example, the corresponding substituted 5-nitrobenzophenone-2,4-dicarboxylic acids and 4-nitrobenzophenone-2,5-dicarboxylic acids, respectively, are obtained.

EXAMPLE 53

5-amino-4'-fluorobenzophenone-2,4-dicarboxylic acid

4'-fluoro-5-nitrobenzophenone-2,4-dicarboxylic acid is reduced according to the procedure of Example 7; 5-amino-4'-fluorobenzophenone-2,4-dicarboxylic acid is obtained.

When the nitrobenzophenone dicarboxylic acids of Example 52 are used in place of 4'-fluoro-5-nitrobenzophenone-2,4-dicarboxylic acid in the above example, the corresponding aminobenzophenone dicarboxylic acids are obtained, 4',5-dinitrobenzophenone - 2,4 - dicarboxylic acid gives 4',5-diaminobenzophenone-2,4-dicarboxylic acid.

When 7-nitroanthraquinone-2-carboxylic acid, 2 - methoxy-5- and 8-nitroanthraquinone and 2-hydroxy-6-nitroanthraquinone are used in the above example in place of 4'-fluoro-5-nitrobenzophenone - 2,4- dicarboxylic acid, 7-aminoanthraquinone-2-carboxylic acid, 5- and 8-amino-2-methoxyanthraquinone, and 6-amino-2-hydroxyanthraquinone, respectively, are obtained.

Iron filings may be used in place of stannous chloride as reducing agent in the above example.

EXAMPLE 54

4'-fluoro-5-hydroxybenzophenone-2,4-dicarboxylic acid 5-amino-4'-fluorobenzophenone-2,4 - dicarboxylic acid is diazotized, and the diazonium salt decomposed thermally according to the procedure of Example 29; 4'-fluoro-5-hydroxybenzophenone-2,4-dicarboxylic acid is obtained.

When the aminobenzophenone dicarboxylic acids of Example 53 are used in place of 5-amino-4'-fluorobenzophenone-2,4-dicarboxylic acid in the above example, the corresponding hydroxybenzophenone dicarboxylic acids are obtained (4',5-diaminobenzophenone-2,4-dicarboxylic acid gives 4',5-dihydroxybenzophenone-2,4-dicarboxylic acid).

When 4-amino-2'-chloro-, 4-amino-4'-chloro-, and 4-amino-4'-fluorobenzophenone-2,5-dicarboxylic acid are used in place of 5-amino-4'-fluorobenzophenone-2,4-dicarboxylic acid in the above example, 2'-chloro-, 4'-chloro-, and 4' - fluoro-4-hydroxybenzophenone-2,5-dicarboxylic acid, respectively, are obtained.

EXAMPLE 55

6-fluoro-2-hydroxyanthraquinone-3-carboxylic acid

4'-fluoro-5-hydroxybenzophenone - 2,4 - dicarboxylic acid is cyclized according to the procedure of Example 44; 6-fluoro-2-hydroxyanthraquinone-3-carboxylic acid is obtained.

When the 2'- and 4'-substituted 5-hydroxybenzophenone-2,4-dicarboxylic acids of Example 54 are used in place of 4'-fluoro-5-hydroxybenzophenone-2,4-dicarboxylic acid in the above example, the corresponding 8- and 6-substituted 2-hydroxyanthraquinone-3-carboxylic acids, respectively, are obtained.

When the 2'- and 4'-substituted 4-hydroxybenzophenone-2,5-dicarboxylic acids of Example 54 are used in place of 4'-fluoro-5-hydroxybenzophenone-2,4-dicarboxylic acid in the above example, the corresponding 5- and 7-substituted 2-hydroxyanthraquinone-3-carboxylic acids, respectively, are obtained.

2',4' - dichloro - 4 - hydroxybenzophenone - 2,5 - dicarboxylic acid and 4',5-dihydroxybenzophenone-2,4-dicarboxylic acid give 5,7-dichloro-2-hydroxyanthraquinone-3-carboxylic acid and 2,6-dihydroxyanthraquinone-3-carboxylic acid, respectively.

EXAMPLE 56

6-fluoro-2-hydroxyanthracene-3-carboxylic acid 6-fluoro-2-hydroxyanthraquinone-3-carboxylic acid is reduced according to the procedure for Example 48; 6-fluoro-2-hydroxyanthracene-3-carboxylic acid is obtained.

When 5,8-dichloro-, 6-methyl-, or 7-methyl-2-hydroxyanthraquinone-3-carboxylic acid, or any of the substituted 2-hydroxyanthraquinone-3-carboxylic acids of Example 55 is used in place of 6-fluoro-2-hydroxyanthraquinone-3-carboxylic acid in the above example, the corresponding substituted 2-hydroxyanthracene-3-carboxylic acid is obtained.

EXAMPLE 57

2-carboxy-5-fluoro-4'-methoxydiphenyl ether

A solution of 2-chloro-4-fluorobenzoic acid (34.9 g., 0.20 mole) in nitrobenzene (250 ml.) is stirred vigorously at 80° while anhydrous potassium carbonate (41.5 g., 0.30 mole), copper bronze (1 g.), and cuprous iodide (1 g.) are added portionwise. When the addition is complete, p-methoxyphenol (27.3 g., 0.22 mole) is added, the temperature is raised to 150°, and the mixture is stirred for 6 hours at 150–160°.

The reaction mixture is allowed to cool and diluted with water. Nitrobenzene is removed by steam-distillation, and the residual aqueous solution is filtered from tarry material, and acidified (pH 2) with hydrochloric acid. After thorough chilling, the 2-carboxy-5-fluoro-4'-methoxydiphenyl ether is collected by filtration, and washed well with cold water.

The crude product is purified by dissolution in water containing ca. 3-molar excess of potassium carbonate; the solution is filtered, evaporated to small volume, and chilled thoroughly; the salt is collected by filtration, and reconverted to the free acid.

Alternatively, the crude product is converted (methanolic HCl or methanol/sulfuric acid) to the methyl ester, the ester purified by crystallization or distillation in vacuo, and the free acid regenerated by hydrolysis (N-potassium hydroxide).

In place of nitrobenzene, pentyl or hexyl alcohol, or anisole may be used as solvent in the above example.

Sodium methoxide (2 equivalents) may be used in place of potassium carbonate in the above example. In this case, the reactants and catalyst are added to a solution of sodium in methanol at room temperature, and the methanol is distilled off on the steam bath. The reaction mixture is then heated at 150–160° for 2–3 hours without solvent.

2-bromo-4,5-dimethylbenzoic acid, 2-boromo-4-ethylbenzoic acid, 2-bromo-4-trifluoromethylbenzoic acid, 2-chloro-5-fluorobenzoic acid, 2-chloro-5-iodobenzoic acid, 2-chloro-4-methylbenzoic acid, 2-chloro-4-nitrobenzoic acid, 2-chloro-5-nitrobenzoic acid, 2-chloro-4-phenylbenzoic acid, 2,4-dibromobenzoic acid, 2,5-dibromozenzoic acid, 2,4-dichlorobenzoic acid, and 2,5-dichlorobenzoic acid may be used in place of 2-chloro-4-fluorobenzoic acid in the above example. When the 4-substituted 2-halobenzoic acids are used, the corresponding 5-substituted 2-carboxy-4'-methoxydiphenyl ethers are obtained; when the 5-substituted 2-halobenzoic acids are used, the corresponding 4-substituted 2-carboxy-4'-methoxydiphenyl ethers are obtained.

When 2-chloro-5-nitrobenzoic acid is used in place of 2-chloro-4-fluorobenzoic acid, and 4-benzylphenol, 4-bromophenol, 4-cyclohexylphenol, 4-ethoxyphenol, 4-fluorophenol, 4-(methylmercapto)phenol, 4-phenylphenol or 4-trifluoromethylphenol is used in place of p-methoxyphenol in the above example, the corresponding 4'-substituted 2-carboxy-4-nitrodiphenyl ether is obtained.

When 2-chloro-4-nitrobenzoic acid is used in place of 2-chloro-4-fluorobenzoic acid, and the 4-substituted phenols cited above are used in place of p-methoxyphenol in the above example, the corresponding 4'-substituted 2-caroxy-5-nitrodiphenyl ethers are obtained.

When p-methoxybenzenethiol is used in place of p-methoxyphenol in the above example, 2-carboxy-5-fluoro-4'-methoxydiphenyl sulfide is obtained.

When the 4- and 5-substituted 2-halobenzoic acids cited above are used in place of 2-chloro-4-fluorobenzoic acid, and p-methoxybenzenethiol is used in place of p-methoxyphenol, the corresponding 5- and 4-substituted 2-carboxy-4'-methoxydiphenyl sulfides, respectively, are obtained.

When p-nitrobenzenethiol is used in place of p-methoxyphenol in the above example, 2-carboxy-5- fluoro-4'-nitrodiphenyl sulfide is obtained.

When the 4- and 5- substituted 2-halobenzoic acids, 2-bromo-4,5-dimethylbenzoic acid, 2-bromo-4-ethylbenzoic acid, 2-bromo-4-trifluoromethylbenzoic acid, 2-chloro-5-fluorobenzoic acid, 2-chloro-4-phenylbenzoic acid, and 2,4-dibromobenzoic acid, are used in place of 2-chloro-4-fluorobenzoic acid, and p-nitrobenzenethiol is used in place of p-methoxyphenol, the corresponding 5- and 4-substituted 2-carboxy-4'-nitrodiphenyl sulfides, respectively, are obtained.

When 2-chloro-5-nitrobenzoic acid is used in place of 2-chloro-4-fluorobenzoic acid, and 4-ethoxybenzenethiol, 4-fluorobenzenethiol, 4-isopropylbenzenethiol, or 4-phenylbenzenethiol is used in place of p-methoxyphenol in the above example, the corresponding 4'-substituted 2-carboxy-4-nitrodiphenyl sulfide is obtained.

When 2-chloro-4-nitrobenzoic acid is used in place of 2-chloro-4-fluorobenzoic acid, and 4-bromobenzenethiol, 4-iodobenzenethiol, or any of the 4-substituted thiophenols cited above is used in place of p-methoxyphenol in the above example, the corresponding 4'-substituted 2-carboxy-5-nitrodiphenyl sulfide is obtained.

EXAMPLE 58

2-(p-fluorothiophenoxy)-5-nitrobenzaldehyde

A mixture of p-fluorobenzenethiol (53.8 g., 0.42 mole), 2-chloro-5-nitrobenzaldehyde (74.2 g., 0.40 mole), sodium bicarbonate (35.1 g., 0.42 mole), 95% ethanol (0.50 ml.), and water (450 ml.) is heated under reflux for 2 hours.

The reaction mixture is chilled thoroughly, and the 2-(p-fluorothiophenoxy)-5-nitrobenzaldehyde is collected by filtration, and washed well with cold water.

When 4-chlorobenzenethiol, 4-ethoxybenzenethiol, 4-isopropylbenzenethiol, 4-methoxybenzenethiol, or 4-phenylbenzenethiol is used in place of p-fluorobenzenethiol in the above example, the corresponding 2-(p-substituted thiophenoxy)-5-nitrobenzaldehyde is obtained.

When 2-chloro-4-nitrobenzaldehyde is used in place of 2-chloro-5-nitrobenzaldehyde in the above example, 2-(p-fluorothiophenoxy)-4-nitrobenzaldehyde is obtained.

When 2-chloro-4-nitrobenzaldehyde is used in place of 2-chloro-5-nitrobenzaldehyde, and 4-bromobenzenethiol, 4-iodobenzenethiol, or any of the 4-substituted thiophenols cited above is used in place of p-fluorobenzenethiol, the corresponding 2-(p-substituted thiophenoxy)-4-nitrobenzaldehyde is obtained.

When p-nitrobenzenethiol is used in place of p-fluorobenzenethiol, and 2,4-dichlorobenzaldehyde, 2-chloro-4-methoxybenzaldehyde, 2-chloro-4-methylbenzaldehyde, 2-chloro - 4 - methylsulfonylbenzaldehyde, or 2-chloro-4-phenylbenzaldehyde is used in place of 2-chloro-5-nitrobenzaldehyde in the above example, the corresponding 4 - substituted 2 - (p-nitrothiophenoxy)-benzaldehyde is obtained.

When p-methoxybenzenethiol is used in place of p-fluorobenzenethiol, and the 4-substituted 2-chlorobenzaldehydes cited above (except for 2-chloro-p-anisaldehyde) are used in place of 2-chloro-5-nitrobenzaldehyde in the above example, the corresponding 4-substituted 2-(p-methoxythiophenoxy)benzaldehydes are obtained.

When p-methoxybenzenethiol is used in place of p-fluorobenzenethiol, and 6-chloro-m-tolualdehyde and 2,5-dichlorobenzaldehyde are used in place of 2-chloro-5-nitrobenzaldehyde, 5-methyl- and 5-chloro-2(p-methoxythiophenoxy)benzaldehyde, respectively, are obtained.

EXAMPLE 59

6-fluoro-2-methoxy-9-xanthenone 2-carboxy-5-fluoro-4'-methoxydiphenyl ether (19.7 g., 0.075 mole) is dissolved in concentrated sulfuric acid (180 ml.) by heating at 100° in an oil-bath. When solution is complete, heating is continued at 100° for an additional hour.

The solution is allowed to cool, and then is poured onto cracked ice (600 g.). 6-fluoro-2-methoxy-9-xanthenone is collected by filtration, and washed well with dilute aqueous sodium hydroxide and with water.

Polyphosphoric acid may be used in place of sulfuric acid as cyclodehydrating agent in the above example.

When the 5-substituted 2-carboxy-4'-methoxydiphenyl ethers of Example 57 are used in place of 2-carboxy-5-fluoro-4'-methoxydiphenyl ether in the above example, the corresponding 6-substituted 2-methoxy-9-xanthenones are obtained.

When the 4-substituted 2-carboxy-4'-methoxydiphenyl ethers of Example 57 are used in place of 2-carboxy-5-fluoro-4'-methoxydiphenyl ether in the above example, the corresponding 7-substituted 2-methoxy-9-xanthenones are obtained.

When the 4'-substituted 2-carboxy-4-nitrodiphenyl ethers of Example 57 are used in place of 2-carboxy-5-fluoro-4'-methoxydiphenyl ether in the above example, the corresponding 7-substituted 2-nitro-9-xanthenones are obtained.

When the 4'-substituted 2-carboxy-5-nitrodiphenyl ethers of Example 57 are used in place of 2-carboxy-5-fluoro-4'-methoxydiphenyl ether in the above example, the corresponding 7-substituted 3-nitro-9-xanthenones are obtained.

When the 5-substituted 2-carboxy-4'-methoxydiphenyl sulfides of Example 57 are used in place of 2-carboxy-5-fluoro-4'-methoxydiphenyl ether in the above example, the corresponding 6-substituted 2-methoxy-9-thioxanthenones are obtained.

When the 4-substituted 2-carboxy-4'-methoxydiphenyl sulfides of Example 57 are used in place of 2-carboxy-5-fluoro-4'-methoxydiphenyl ether in the above example, the corresponding 7-substituted 2-methoxy-9-thioxanthenones are obtained.

When the 5-substituted 2-carboxy-4'-nitrodiphenyl sulfides of Example 57 are used in place of 2-carboxy-5-fluoro-4'-methoxydiphenyl ether in the above example, the corresponding 6-substituted 2-nitro-9-thioxanthenones are obtained.

When the 4-substituted 2-carboxy-4'-nitrodiphenyl sulfides or 4'-substituted 2-carboxy-4-nitrodiphenyl sulfides of Example 57 are used in place of 2-carboxy-5-fluoro-4'-methoxydiphenyl ether in the above example, the corresponding 7-substituted 2-nitro-9-thioxanthenones are obtained.

When the 4'-substituted 2-carboxy-5-nitrodiphenyl sulfides of Example 57 are used in place of 2-carboxy-5-fluoro-4'-methoxydiphenyl ether in the above example, the corresponding 7-substituted 3-nitro-9-thioxanthenones are obtained.

EXAMPLE 60

7-fluoro-2-nitrothioxanthene and 7-fluoro-2-nitro-9-thioxanthenone 2-(p-fluorothiophenoxy)-5-nitrobenzaldehyde (27.7 g., 0.10 mole) is added portionwise, with shaking, to concentrated sulfuric acid (280 ml.) at room temperature. The resulting solution is allowed to stand for 3 hours at room temperature, and is then poured onto cracked ice (600 g.). The precipitated solid, a mixture of 7-fluoro-2-nitrothioxanthene and 7-fluoro-2-nitro-9-thioxanthenone, is collected by filtration, washed well with water, and dried. The mixture is separated into its components by fractional crystallization from acetic acid.

When the 2-(p-substituted thiophenoxy)-5-nitrobenzaldehydes of Example 58 are used in place of 2-(p-fluorothiophenoxy)-5-nitrobenzaldehyde in the above example, equimolecular mixtures of the corresponding 7-substituted 2-nitrothioxanthenes and 7-substituted 2-nitro-9-thioxanthenones are obtained.

When the 2-(p-substituted thiophenoxy)-4-nitrobenzaldehydes of Example 58 are used in place of 2-(p-fluorothiophenoxy)-5-nitrobenzaldehyde in the above example, equimolecular mixtures of the corresponding 7-substituted 3-nitrothioxanthenes and 7-substituted 3-nitro-9-thioxanthenones are obtained.

When the 4-substituted 2-(p-nitrothiophenoxy)benzaldehydes of Example 58 are used in place of 2-(p-fluorothiophenoxy)-5-nitrobenzaldehyde in the above example, equimolecular mixtures of the corresponding 6-substituted 2-nitrothioxanthenes and 6-substituted 2-nitro-9-thioxanthenones are obtained.

When the 4- and 5-substituted 2-(p-methoxythiophenoxy)benzaldehydes of Example 58 are used in place of 2-(p-fluorothiophenoxy)-5-nitrobenzaldehyde in the above example, equimolecular mixtures of the corresponding 6-substituted 2-methoxythioxanthenes and 6-substituted 2-methoxy-9-thioxanthenones, and the corresponding 7-substituted 2-methoxythioxanthenes and 7-substituted 2-methoxy-9-thioxanthenones, respectively, are obtained.

EXAMPLE 61

7-fluoro-2-nitro-9-thioxanthenone-10,10-dioxide

The thioxanthene-thioxanthenone mixture prepared according to the procedure of Example 60 from 2-(p-fluorothiophenoxy)-5-nitrobenzaldehyde (0.030 mole) is transferred directly from the filter to a reaction flask with glacial acetic acid (150 ml.). To this mixture is added chromium trioxide (12.5 g., 0.125 mole), and then heat is applied cautiously until refluxing begins. After the initially exothermic reaction subsides, external heat is again applied, and refluxing continued for an additional 2 hours.

The reaction mixture is chilled thoroughly, and 7-fluoro-2-nitro-9-thioxanthenone-10,10-dioxide is collected by filtration, washed well with cold water, and dried. The product is purified by recrystallization from acetic anhydride.

7-fluoro-2-nitro-9-thioxanthenone-10,10-dioxide is also prepared when either 7-fluoro-2-nitrothioxanthene or 7-fluoro-2-nitro-9-thioxanthenone is used in place of the thioxanthene - thioxanthenone mixture in the above example.

When any of the substituted nitro-(thioxanthene-thioxanthenone) mixtures of Example 60, or either of the separated components of any of those mixtures is used in place of the 7-fluoro - 2 - nitro-(thioxanthene-thioxanthenone) mixture in the above example, the corresponding substituted nitro-9-thioxanthenone - 10,10 - dioxide is obtained.

When any of the substituted nitro-9-thioxanthenones of Example 59 is used in place of the 7-fluoro-2-nitro(thioxanthene-thioxanthenone) mixture in the above example, the corresponding substituted nitro-9-thioxanthenone-10,10-dioxide is obtained.

30% hydrogen peroxide may be used as oxidant in preparing the substituted nitro-9-thioxanthenone - 10,10 - dioxides; it is not so reliable as chromium trioxide, however, occasionally giving rise to partially oxidized compounds.

EXAMPLE 62

2-amino-7-fluorothioxanthene 7-fluoro-2-nitrothioxanthene is reduced according to the procedure of Example 38; 2-amino-7-fluorothioxanthene is obtained.

When 7-iodo-2-nitrothioxanthene, 7-methyl - 2 - nitrothioxanthene, or any of the 6- or 7-substituted 2-nitrothioxanthenes of Example 60 is used in place of 7-fluoro-2-nitrothioxanthene in the above example, the corresponding substituted 2-aminothioxanthene is obtained.

When 7-methyl-3-nitrothioxanthene or any of the 7-substituted 3-nitrothioxanthenes of Example 60 is used in place of 7-fluoro-2-nitrothioxanthene in the above example, the corresponding 7-substituted 3-aminothioxanthene is obtained.

When 7-chloro-2-nitro-9-thioxanthenone, 8 - chloro-2-nitro-9-thioxanthenone, 8-chloro - 5 - methyl - 2 - nitro-9-thioxanthenone, 5,8-dichloro-2-nitro-9-thioxanthenone, or any of the 6- or 7-substituted 2-nitro-9-thioxanthenones of Examples 59 and 60 is used in place of 7-fluoro-2-nitrothioxanthene in the above example, the corresponding substituted 2-amino-9-thioxanthenone is obtained.

When 7-chloro-3-nitro-9-thioxanthenone, 6,8-dimethyl-3-nitro-9-thioxanthenone, 7-methyl-3-nitro - 9 - thioxanthenone, or any of the 7-substituted 3-nitro - 9 - thioxanthanones of Examples 59 and 60 is used in place of 7-fluoro-2-nitrothioxanthene in the above example, the corresponding substituted 3-amino - 9 - thioxanthenone is obtained.

When 7-carboxy - 2 - nitro-9-thioxanthenone-10,10-dioxide, 7-chloro - 2 - nitro-9-thioxanthenone-10,10-dioxide, 8-chloro-2 - nitro-9-thioxanthenone-10,10-dioxide, 7-methyl-2-nitro-9-thioxanthenone-10,10-dioxide, or any of the 6- or 7-substituted 2-nitro-9-thioxanthenone-10,10-dioxide of Example 61 is used in place of 7-fluoro-2-nitrothioxanthene in the above example, the corresponding substituted 2-amino-9-thioxanthenone-10,10-dioxide is obtained.

When 7-methyl-3-nitro - 9 - thioxanthenone-10,10-dioxide or any of the 7-substituted 3-nitro-9-thioxanthenone-10,10-dioxides of Example 61 is used in place of 7-fluoro-2-nitrothioxanthene in the above example, the corresponding substituted 3-amino-9-thioxanthenone-10,10-dioxide is obtained.

When 5-n-butyl-2-nitro-9-xanthenone, 5-chloro-2-nitro-9-xanthenone, 5,7-dichloro-2-nitro-9-xanthenone, 5-ethyl-2-nitro-9-xanthenone, 5-n-propyl-2-nitro - 9 - xanthenone, 5-n-propyl-2-nitro-9-xanthenone, 7-n - butyl - 2 - nitro-9-xanthenone, 7,8-dichloro-2-nitro-9-xanthenone, 7-ethyl-2-nitro-9-xanthenone, 7-iodo-2-nitro-9-xanthenone, 7-methyl-2-nitro-9-xanthenone, 7-n-propyl-2-nitro-9-xanthenone, 8-chloro-2-nitro-9-xanthenone, or any of the 7-substituted 2-nitro-9-xanthenones of Example 59 is used in place of 7-fluoro-2-nitrothioxanthene in the above example, the corresponding substituted 2-amino-9-xanthenone is obtained.

When 8-chloro-3-nitro-9-xanthenone or any of the 7-substituted 3-nitro-9-xanthenones of Example 59 is used in place of 7-fluoro-2-nitrothioxanthene in the above example, the corresponding substituted 3-amino-9-xanthenone is obtained.

EXAMPLE 63

2-amino-7-fluorothioxanthene-10,10-dioxide

A mixture of 7-fluoro-2-nitro-9-thioxanthenone-10,10-dioxide (7.7 g., 0.025 mole), zinc dust (6.5 g., 0.10 g. atom; previously washed with hot dilute hydrochloric acid and water), and 80% acetic acid (100 ml.) is heated to incipient boiling. After spontaneous boiling subsides, external heating is again applied, and boiling is continued for 30 minutes longer.

The hot reaction mixture is filtered from unused zinc, and the filtrate is diluted with water (400 ml.) and chilled thoroughly. 2-amino-7-fluorothioxanthene-10,10-dioxide is collected by filtration, and washed well with dilute aqueous sodium bicarbonate and water.

2-amino-7-fluorothioxanthene-10,10-dioxide is also prepared when 2-amino-7-fluoro-9-thioxanthenone-10,10-dioxide is used in place of 7-fluoro-2-nitro-9-thioxanthenone-10,10-dioxide in the above example.

When the substituted 2- and 3-nitro-9-thioxanthenone-10,10-dioxides of Example 61 are used in place of 7-fluoro-2-nitro-9-thioxanthenone-10,10-dioxide in the above example, the corresponding substituted 2- and 3-aminothioxanthene-10,10-dioxides, respectively, are obtained.

When 2-amino - 7 - bromo-9-thioxanthenone-10,10-dioxide, 2-amino - 7 - chloro-9-thioxanthenone-10,10-dioxide, 2-amino-7-iodo-9-thioxanthenone-10,10-dioxide, or any of the substituted 2-amino-9-thioxanthenone-10,10-dioxides of Example 62 is used in place of 7-fluoro-2-nitro-9-thioxanthenone-10,10-dioxide in the above example, the corresponding substituted 2-aminothioxanthene-10,10-dioxide is obtained.

When the substituted 3-amino-9-thioxanthenone-10,10-dioxides of Example 62 are used in place of 7-fluoro-2-nitro-9-thioxanthenone-10,10-dioxide in the above example, the corresponding substituted 3-aminothioxanthene-10,10-dioxides are obtained.

When 2-amino-7-bromo-9-thioxanthenone, 2-amino-6-chloro-9-thioxanthenone, 2-amino - 7 - iodo-9-thioxanthenone, 2-amino-6-methyl-9-thioxanthenone, 2 - amino-7-methyl-9-thioxanthenone or any of the substituted 2-amino-9-thioxanthenones of Example 62 is used in place of 7-fluoro-2-nitro-9-thioxanthenone-10,10 - dioxide in the above example, the corresponding substituted 2-aminothioxanthene is obtained.

When the substituted 2-nitro-9-thioxanthenones of Examples 59, 60, and 62 are used in place of 7-fluoro-2-nitro-9-thioxanthenone-10,10-dioxide in the above example, the corresponding substituted 2-aminothioxanthenes are obtained.

When the substituted 3-amino-9-thioxanthenones of Example 62 or the substituted 3-nitro-9-thioxanthenones of Examples 59, 60, and 62 are used in place of 7-fluoro-2-nitro-9-thioxanthenone-10,10-dioxide in the above example, the corresponding substituted 3-aminothioxanthenes are obtained.

When 2-methoxy-9-thioxanthenone or any of the substituted 2-methoxy-9-thioxanthenones of Examples 59 and 60 is used in place of 7-fluoro-2-nitro-9-thioxanthenone-10,10-dioxide in the above example, 2-methoxythioxanthene or the corresponding substituted 2-methoxythioxanthene, respectively, is obtained.

When 8 - chloro-3-methoxy-5-methyl-9-thioxanthenone, 2-hydroxy - 8 - methoxy-9-thioxanthenone, 2-hydroxy-5-methyl-9-thioxanthenone, and 2-hydroxy-7-methyl-9-thioxanthenone are used in place of 7-fluoro-2-nitro-9-thioxanthenone-10,10-dioxide in the above example, 8-chloro-3-methoxy-5-methylthioxanthene, 2 - hydroxy-8-methoxythioxanthene, 2-hydroxy-5-methylthioxanthene, and 2-hydroxy-7-methylthioxanthene, respectively, are obtained.

EXAMPLE 64

7-fluoro-2-hydroxythioxanthene 2-amino-7-fluorothioxanthene is diazotized and the diazonium salt decomposed thermally according to the procedure of Example 29; 7-fluoro-2-hydroxythioxanthene is obtained.

When 2-amino-7-bromothioxanthene or any of the substituted 2-aminothioxanthenes of Examples 62 and 63 is used in place of 2-amino-7-fluorothioxanthene in the above example, the corresponding substituted 2-hydroxythioxanthene is obtained.

When the substituted 2-aminothioxanthene-10,10-dioxides of Example 63 are used in place of 2-amino-7-fluorothioxanthene in the above example, the corresponding substituted 2-hydroxythioxanthene-10,10-dioxides are obtained.

When the substituted 3-aminothioxanthenes of Examples 62 and 63, and the substituted 3-aminothioxanthene-10,10-dioxides of Example 63 are used in place of 2-amino-7-fluorothioxanthene in the above example, the corresponding substituted 3-hydroxythioxanthenes and 3-hydroxythioxanthene-10,10-dioxides, respectively, are obtained.

When 2-amino-6-chloro - 9 - xanthenone, 2-amino-7-chloro-9-xanthenone, 2-amino-6,8-dimethyl-9-xanthenone, 2-amino-7-nitro-9-xanthenone or any of the substituted 2-amino-9-xanthenones of Example 62 is used in place of 2-amino-7-fluorothioxanthene in the above example, the corresponding substituted 2-hydroxy-9-xanthenone is obtained.

When 3 - amino-5-t-butyl - 8 - methyl-9-xanthenone, 3-amino-7-t-butyl - 9 - xanthenone, 3-amino-6-chloro-9-xanthenone, 3-amino-7-(1,1 - dimethylpropyl)-9-xanthenone, 3-amino-6-nitro - 9 - xanthenone or any of the substituted 3-amino-9-xanthenones of Example 62 is used in place of 2-amino-7-fluorothioxanthene in the above example, the corresponding substituted 3-hydroxy-9-xanthenone is obtained.

EXAMPLE 65

6-fluoro-2-methoxyxanthene

A refluxing solution of 6-fluoro-2-methoxy-9-xanthenone (3.7 g., 0.05 mole) in ethanol (60 ml.) is treated with sodium (6.9 g., 0.30 g.-atom), added as rapidly as possible.

The ethanol is then removed in steam, and the residue crystallized from aqueous alcohol to give 6-fluoro-2-methoxyxanthene.

When 8-chloro - 2 - methoxy-5-methyl-9-xanthenone, 2-methoxy-7-methyl-9-xanthenone, or any of the substituted 2-methoxy - 9 - xanthenones of Example 59 is used in place of 6-fluoro-2-methoxy-9-xanthenone in the above example, the corresponding substituted 2-methoxyxanthene is obtained.

When 2-hydroxy-9-xanthenone, 6-amino-2-hydroxy-9-xanthenone, 2-hydroxy-8-methoxy-9-xanthenone or any of the substituted 2-hydroxy-9-xanthenones of Example 64 is used in place of 6-fluoro-2-methoxy-9-xanthenone in the above example, the corresponding substituted 2-hydroxyxanthene is obtained.

When 3-methoxy-9-xanthenone, 7-t-butyl-3-methoxy-9-xanthenone, 5-t-butyl - 3 - methoxy-8-methyl-9-xanthenone, 6-chloro-3-methoxy-9-xanthenone, 8-chloro-3-methoxy-5-methyl-9-xanthenone and 3-methoxy-6-methyl-9-xanthenone are used in place of 6-fluoro-2-methoxy-9-xanthenone in the above example, 3-methoxyxanthene, 7-t-butyl-3-methoxyxanthene, 5-t-butyl - 3 - methoxy-8-methylxanthene, 6-chloro-3-methoxyxanthene, 8-chloro-3-methoxy-5-methylxanthene, and 3-methoxy-6-methylxanthene, respectively, are obtained.

When 3-hydroxy-8-methoxy-9-xanthenone, 3-hydroxy-7-methyl-9-xanthenone, 3-hydroxy-8-methyl-9-xanthenone or any of the substituted 3-hydroxy-9-xanthenones of Example 64 is used in place of 6-fluoro-2-methoxy-9-xanthenone in the above example, the corresponding substituted 3-hydroxyxanthene is obtained.

EXAMPLE 66

6-fluoro-2-hydroxyxanthene 6-fluoro-2-methoxyxanthene is demethylated by treatment of its solution in xylene with anhydrous aluminum chloride on the steam-bath; 6-fluoro-2-hydroxyxanthene is obtained.

When the substituted 2-methoxyxanthenes of Example 65 and 2-methoxy-9-xanthenones of Examples 59 and 65 are used in place of 6-fluoro-2-methoxyxanthene in the above example, the corresponding substituted 2-hydroxyxanthenes and 2-hydroxy-9-xanthenones, respectively, are obtained.

When the substituted 3-methoxyxanthenes of Example 65 are used in place of 6-fluoro-2-methoxyxanthene in the above example, the corresponding substituted 3-hydroxyxanthenes are obtained.

When the substituted 2-methoxythioxanthenes of Examples 60 and 63 and 3-methoxythioxanthenes of Example 63 are used in place of 6-fluoro-2-methoxyxanthene in the above example, the corresponding substituted 2- and 3-hydroxythioxanthenes, respectively, are obtained.

EXAMPLE 67

6-fluoro-1-formyl-2-hydroxy-9-xanthenone

A mixture of 6-fluoro-2-hydroxy-9-xanthenone (23.0 g., 0.10 mole), hexamethylenetetramine (98.1 g., 0.70 mole), and acetic acid (800 ml.) is heated on the steam-bath for 7 hours. The mixture is then treated with boiling 1:1 aqueous hydrochloric acid (400 ml.), refluxed for 10 minutes, poured into water (4 l.), and allowed to stand overnight. 6-fluoro-1-formyl - 2 - hydroxy-9-xanthenone is collected by filtration, washed well with water, dried, and recrystallized from petroleum ether.

6-fluoro-1-formyl-2-hydroxy-9-xanthenone may also be prepared by heating a mixture of 6-fluoro-2-hydroxy-9-xanthenone, sodium hydroxide, chloroform, and water under reflux with stirring for ca. 4 hours (Reimer-Tiemann conditions).

When the substituted 2-hydroxy-9-xanthenones of Examples 64 and 66 are used in place of 6-fluoro-2-hydroxy-9-xanthenone in the above example, the corresponding substituted 1 - formyl - 2 - hydroxy-9-xanthenones are obtained.

EXAMPLE 68

6-fluoro-2-hydroxy-9-xanthenone-1-carboxylic acid (a) 2-acetoxy-6-fluoro-1-formyl-9-xanthenone.—A solution of 6-fluoro-1-formyl-2-hydroxy-9-xanthenone (5.2 g., 0.020 mole) and acetic anhydride (2.2 g., 0.022 mole) in pyridine (25 ml.) is heated under reflux for 2 hours. The solution is allowed to cool, and then is poured into ice-water (75 ml.). The resulting suspension is rendered acidic by the addition of hydrochloric acid, and then is extracted repeatedly with methylene chloride. The combined extracts are washed with aqueous 10% sodium bicarbonate and water, dried over anhydrous magnesium sulfate, filtered, and evaporated in vacuo to give 2-acetoxy-6-fluoro-1-formyl-9-xanthenone. The crude product is purified by recrystallization from ethanol.

(b) 2 - acetoxy - 6 - fluoro-9-xanthenone-1-carboxylic acid.—A solution of 2-acetoxy-6-fluoro-1-formyl-9-xanthenone (3.0 g., 0.010 mole) in boiling acetone (400 ml.) is treated portionwise during 1 hour with powdered potassium permanganate (4.7 g., 0.030 mole).

When the addition is complete, the reaction mixture is diluted with water (200 ml.), and saturated with sulfur dioxide. The solvents are evaporated in vacuo, and the residue is taken up in chloroform (100 ml.). The chloroform solution is extracted with aqueous sodium bicarbonate, the extract acidified with hydrochloric acid, and chilled thoroughly. 2 - acetoxy-6-fluoro-9-xanthenone-1-carboxylic acid is collected by filtration, and washed well with cold water.

(c) 6 - fluoro - 2 - hydroxy - 9 - xanthenone-1-carboxylic acid.—2 - acetoxy - 6 - fluoro-9-xanthenone-1-carboxylic acid is hydrolyzed with excess 2 N sodium hydroxide to give 6 - fluoro - 2 - hydroxy-9-xanthenone-1-carboxylic acid.

When the substituted 1-formyl-2-hydroxy-9-xanthenones of Example 67 are used in place of 6-fluoro-1-formyl-2-hydroxy-9-xanthenone in the above example, the corresponding substituted 2-acetoxy-9-xanthenone-1-carboxylic acids [part (b)] or 2-hydroxy-9-xanthenone-1-carboxylic acids [part (c)] are obtained.

EXAMPLE 69

7-fluoro-2-hydroxyxanthene-3-carboxylic acid 7-fluoro-2-hydroxyxanthene is carbonated according to the procedure of Example 5; 7-fluoro-2-hydroxyxanthene-3-carboxylic acid is obtained.

When the substituted 2-hydroxyxanthenes of Examples 65 and 66 are used in place of 7-fluoro-2-hydroxyxanthene in the above example, the corresponding substituted 2-hydroxyxanthene-3-carboxylic acids are obtained.

When 7 - methyl - 9-phenyl-3-hydroxyxanthene, 6-dimethylamino-9-phenyl-3-hydroxyxanthene or any of the substituted 3-hydroxyxanthenes of Examples 65 and 66 is used in place of 7-fluoro-2-hydroxyxanthene in the above example, the corresponding substituted 3-hydroxyxanthene-2-carboxylic acid is obtained.

When the substituted 2-hydroxythioxanthenes of Examples 63, 64, and 66 are used in place of 7-fluoro-2-hydroxyxanthene in the above example, the corresponding substituted 2-hydroxythioxanthene-3-carboxylic acids are obtained.

When the substituted 2-hydroxythioxanthene-10,10-dioxides of Example 64 are used in place of 7-fluoro-2-hydroxyxanthene in the above example, the corresponding substituted 2-hydroxythioxanthene-3-carboxylic acid 10,10-dioxides are obtained.

When the substituted 3-hydroxythioxanthenes of Examples 64 and 66 and the substituted 3-hydroxythioxanthene-10,10-dioxides of Example 64 are used in place of 7-fluoro-2-hydroxyxanthene in the above example, the corresponding substituted 3 - hydroxythioxanthene - 2-carboxylic acids, and 3-hydroxythioxanthene-2-carboxylic acid 10,10-dioxides, respectively, are obtained.

EXAMPLE 70

Methyl 7-fluoro-2-hydroxyanthracene-3-carboxylate

To a mixture of 7-fluoro-2-hydroxyanthracene-3-carboxylic acid (0.015 mole) and absolute methanol (6.1 ml., 0.15 mole) is added, slowly with stirring, 0.6 ml. of concentrated sulfuric acid. The mixture is then heated under reflux for 8 hours. The excess methanol is removed by evaporation in vacuo and the residue is treated with stirring with 25 ml. of ice-water. The methyl 7-fluoro-2-hydroxyanthracene-3-carboxylate is collected by filtration, washed thoroughly with cold water and dried. It is purified by recrystallization from aqueous alcohol.

When ethanol, propanol, isopropanol, butanol, isobutanol or benzyl alcohol is used in place of methanol in the procedure described above, the corresponding ester is obtained.

When the other tricyclic carboxylic acids of this invention are used in place of 7-fluoro-2-hydroxyanthracene-3-carboxylic acid, the corresponding esters are obtained.

EXAMPLE 71

8-fluoro-2-hydroxyphenoxazine-3-carboxamide

A mixture of 8-fluoro-2-hydroxyphenoxazine-3-carboxylic acid (0.003 mole), anhydrous benzene (30 ml.), and thionyl chloride (0.0033 mole) is refluxed for 1½ hours, and then added gradually to a vigorously stirred, ice-cooled solution of ammonium hydroxide (75 ml.). The mixture is allowed to warm to room temperature, the benzene is removed under a stream of nitrogen, and the precipitated 8 - fluoro - 2-hydroxyphenoxazine-3-carboxamide is collected and dried.

When aqueous methyl-, dimethyl-, ethyl-, or diethylamine, piperidine, morpholine or pyrrolidine is used in place of ammonia in the above reaction, the corresponding substituted amide is obtained.

When the other tricyclic carboxylic acids of this invention are used in place of 8-fluoro-2-hydroxyphenoxazine-3-carboxylic acid, the corresponding amides are obtained.

EXAMPLE 72

7-fluoro-2-methoxyanthracene-2-carboxylic acid

Methyl 7 - fluoro - 2 - hydroxyanthracene-3-carboxylate (0.010 mole), sodium (230 mg., 0.010 g.-atom) in anhydrous methanol (10 ml.), and methyl iodide (1.6 g., 0.011 mole) are heated together under reflux for several hours. The methanol is removed by evaporation in vacuo, and the residue is treated with 25 ml. of water. The mixture is rendered alkaline with sodium hydroxide to ensure dissolution of unaltered starting material, and then is extracted twice with 25 ml. portions of ether. The combined ethereal extracts are dried over anhydrous magnesium sulfate and evaporated in vacuo to give methyl 7-fluoro-2-methoxyanthracene-3-carboxylate.

The ester is hydrolyzed under reflux by potassium hydroxide (0.7 g., 0.0125 mole) in alcohol (12.5 ml.). The solution is evaporated to dryness in vacuo and the residue taken up in 25 ml. of water. The aqueous solution is filtered and the filtrate acidified with hydrochloric acid. The precipitated 7 - fluoro - 2-methoxyanthracene-3-carboxylic acid is collected by filtration and recrystallized from alcohol.

When ethyl iodide, propyl iodide, butyl iodide, t-butyl iodide, vinyl bromide, and benzyl chloride are used in place of methyl iodide in the procedure described above, the corresponding alkoxy derivative is prepared.

When the other tricyclic carboxylic acid esters of this invention are used in place of methyl 7-fluoro-2-hydroxyanthracene - 3 - carboxylate, the corresponding alkoxy derivatives are obtained.

EXAMPLE 73

7-fluoro-2-acetoxyanthracene-3-carboxylic acid

To a mixture of 7-fluoro-2-hydroxyanthracene-3-carboxylic acid (0.008 mole) in anhydrous pyridine (3 ml.) is added acetic anhydride (5.6 ml.) and the resultant mixture is heated on the steam cone for 1.5 hours. The mixture is kept free from moisture during this time. On cooling, the mixture is added to a stirred 100 ml. portion of water, the aqueous system extracted with ether, the ether layers washed with 1 N hydrochloric acid, and water, and then dried over anhydrous magnesium sulfate. Concentrating the filtered ether solution yields 7-fluoro-2-acetoxyanthracene-3-carboxylic acid.

When propionic anhydride, butyric anhydride, isobutyric anhydride, valeric anhydride, benzoic anhydride, and phenylacetic anhydride are used in place of acetic anhydride in the procedure described above, the corresponding acyloxy derivative is obtained.

When the other tricyclic carboxylic acids of this invention are used in place of 7-fluoro-2-hydroxyanthracene 3-carboxylic acid, the corresponding acyloxy derivatives are obtained.

EXAMPLE 74

Sodium 7-fluoro-2-hydroxyanthracene-3-carboxylate

To a solution of sodium hydroxide (0.001 mole) in water (15 ml.) is added a solution of 7-fluoro-2-hydroxyanthracene-3-carboxylic acid (0.001 mole) in ethanol; the mixture is stirred and gently heated for two hours, and the solvents removed in vacuo on a rotary evaporator to yield sodium 7-fluoro-2-hydroxyanthracene-3-carboxylate.

When potassium hydroxide is used in place of sodium hydroxide in the above example, the corresponding potassium salt is obtained.

When the other tricyclic carboxylic acids of this invention are used in place of 7-fluoro-2-hydroxyanthracene-3-carboxylic acid, the corresponding salts are obtained.

We claim:

1. A compound of the formula:

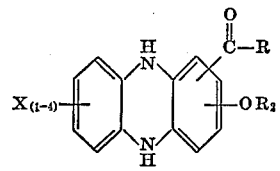

wherein:

R is selected from the group of hydroxy and amino;

$R_2$ is hydrogen or loweralkanoyl;

X is selected from the group of halogen, lower-alkoxy, haloloweralkyl and diloweralkylamino; provided that the $OR_2$ group is always ortho to the

group.

2. 5,10 - dihydro - 7-fluoro-2-hydroxyphenazine-3-carboxylic acid.

References Cited

UNITED STATES PATENTS 3,379,728    4/1968    Schweizer et al. _____ 260—267

ALEX MAZEL, Primary Examiner

A. T. TIGHE, Assistant Examiner